Oct. 24, 1967  A. BROTHMAN ET AL  3,349,371

QUATERNARY DECISION LOGIC

Filed Nov. 20, 1963  13 Sheets-Sheet 1

INVENTORS
ABRAHAM BROTHMAN
LEE HOROWITZ
RICHARD D. REISER
ELSA HOROWITZ

OSTROLENK, FABER, GERB & SOFFEN
ATTORNEYS

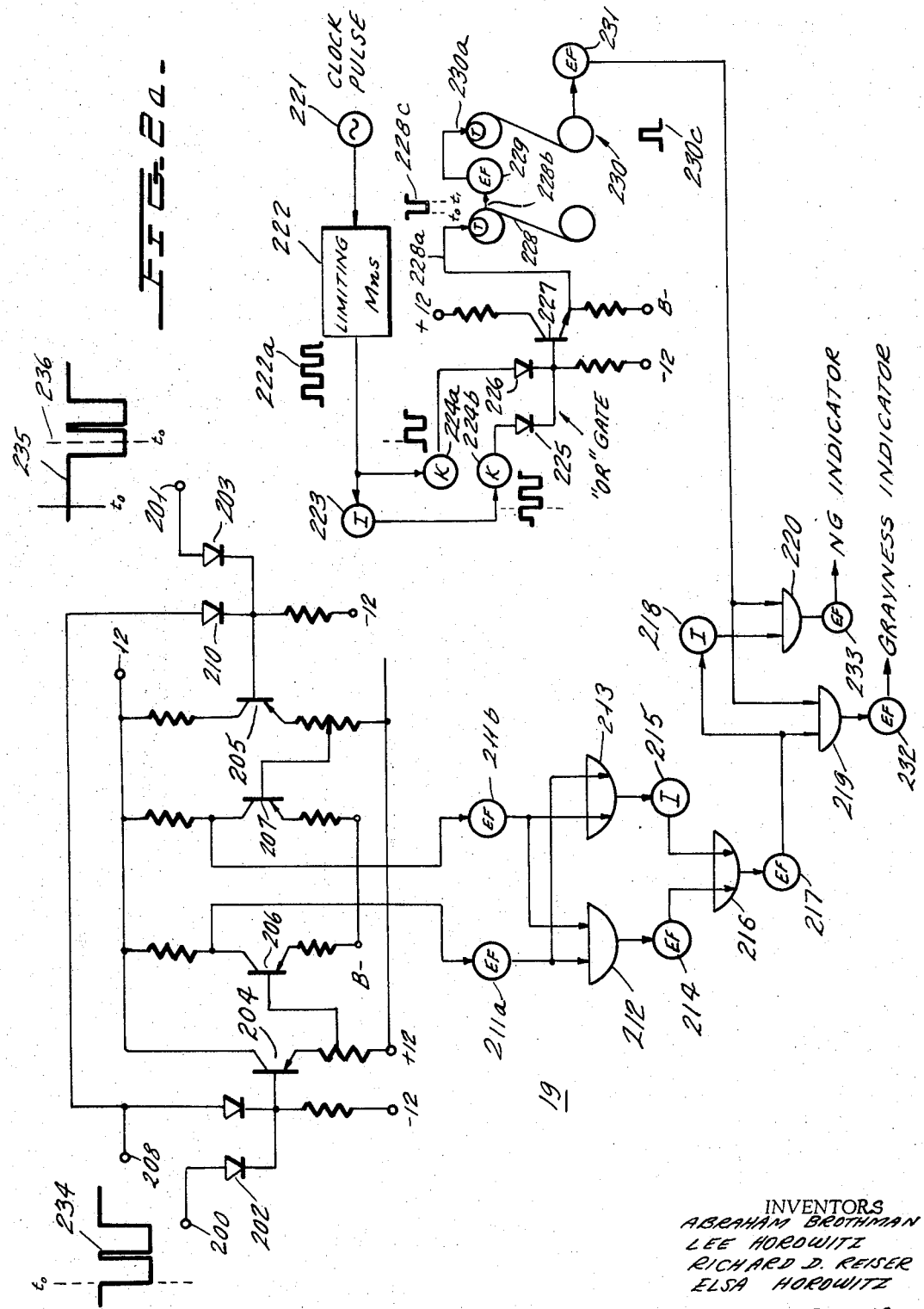

SIGNAL TO NOISE RATIO
SIGNAL TO NOISE RATIO (db)

INVENTORS
ABRAHAM BROTHMAN
LEE HOROWITZ
RICHARD D. REISER
ELSA HOROWITZ

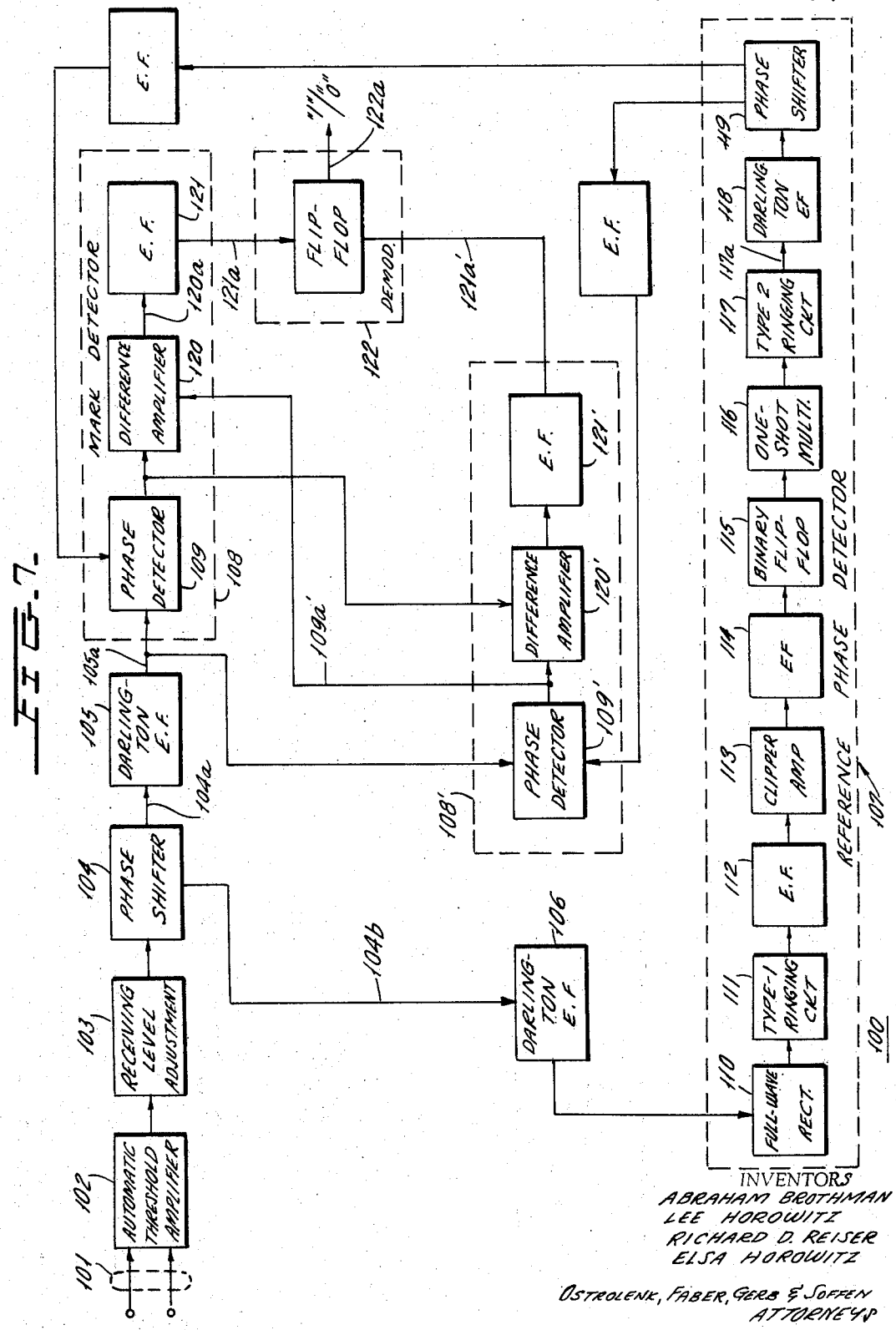

Oct. 24, 1967  A. BROTHMAN ETAL  3,349,371
QUATERNARY DECISION LOGIC
Filed Nov. 20, 1963  13 Sheets-Sheet 6

(a) 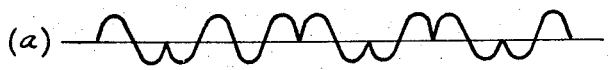 A TYPICAL INFORMATION WAVEFORM (IDEALIZED)

(b)  } TWO POSSIBLE OUTPUTS IN RESPONSE TO (a)
(c)

(d) 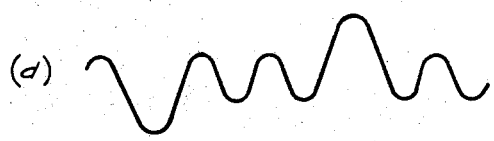 A TYPICAL NON-IDEALIZED CARRIER WAVEFORM (e)  RESPONSE OF FULL-WAVE RECTIFIER TO (d)

(f)  RESPONSE, TYPE 1 RINGING CIRCUIT TO (e)

(g)  RESPONSE OF CLIPPER AMPLIFIER TO (f)

(h)  RESPONSE OF BINARY FLIP-FLOP TO (g)

(i)  RESPONSE OF ONE-SHOT MULTI TO TRIGGERING BY (h)

(j) 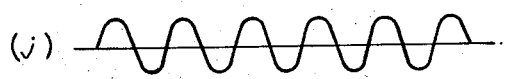 RESPONSE OF TYPE 2 CIRCUIT TO EXCITATION BY (i)

FIG. 8.

INVENTORS
ABRAHAM BROTHMAN
LEE HOROWITZ
RICHARD D. REISER
ELSA HOROWITZ

OSTROLENK, FABER, GERB & SOFFEN
ATTORNEYS

Oct. 24, 1967 A. BROTHMAN ETAL 3,349,371
QUATERNARY DECISION LOGIC
Filed Nov. 20, 1963 13 Sheets-Sheet 7

(k) 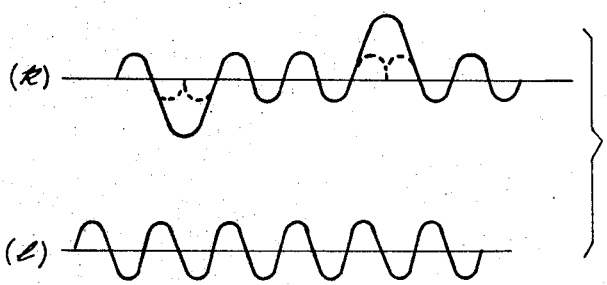

TYPICAL NON-IDEALIZED
INFORMATION CARRIER
& REFERENCE INPUT TO
MARK PHASE DETECTOR (l)

(m) 

MARK PHASE DETECTOR
OUTPUT UNDER INPUT
CONDITIONS OF (k) AND (l)

(n) 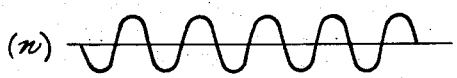

REFERENCE INPUT TO SPACE
PHASE DETECTOR CORRES-
PONDING TO (l)

(o) 

SPACE PHASE DETECTOR
OUTPUT CORRESPONDING
TO (k) AND (n)

(p) 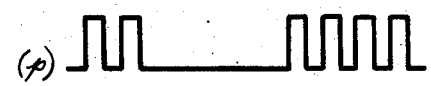

SPACE DIFFERENCE
AMPLIFIER OUTPUT
CORRESPONDING TO (o)

(r) 

MARK DIFFERENCE AMPLIFIER
OUTPUT CORRESPONDING TO (m)

(s) 

DEMODULATOR OUTPUT
CORRESPONDING TO (p) AND (r)

FIG. 8. (CONT'D)

INVENTORS
ABRAHAM BROTHMAN
LEE HOROWITZ
RICHARD D. REISER
ELSA HOROWITZ

OSTROLENK, FABER, GERB & SOFFEN
ATTORNEYS

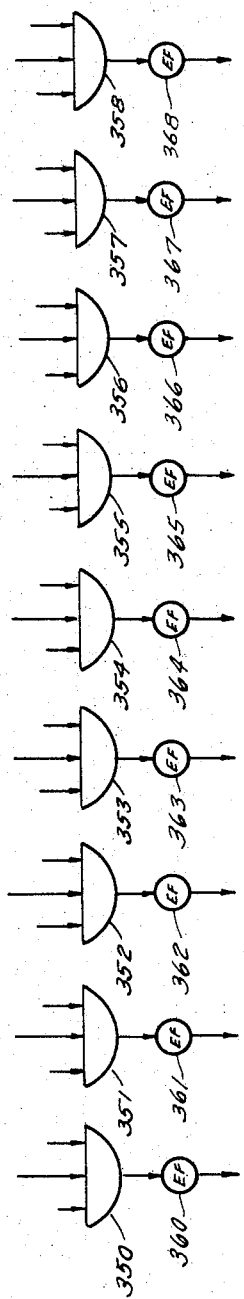
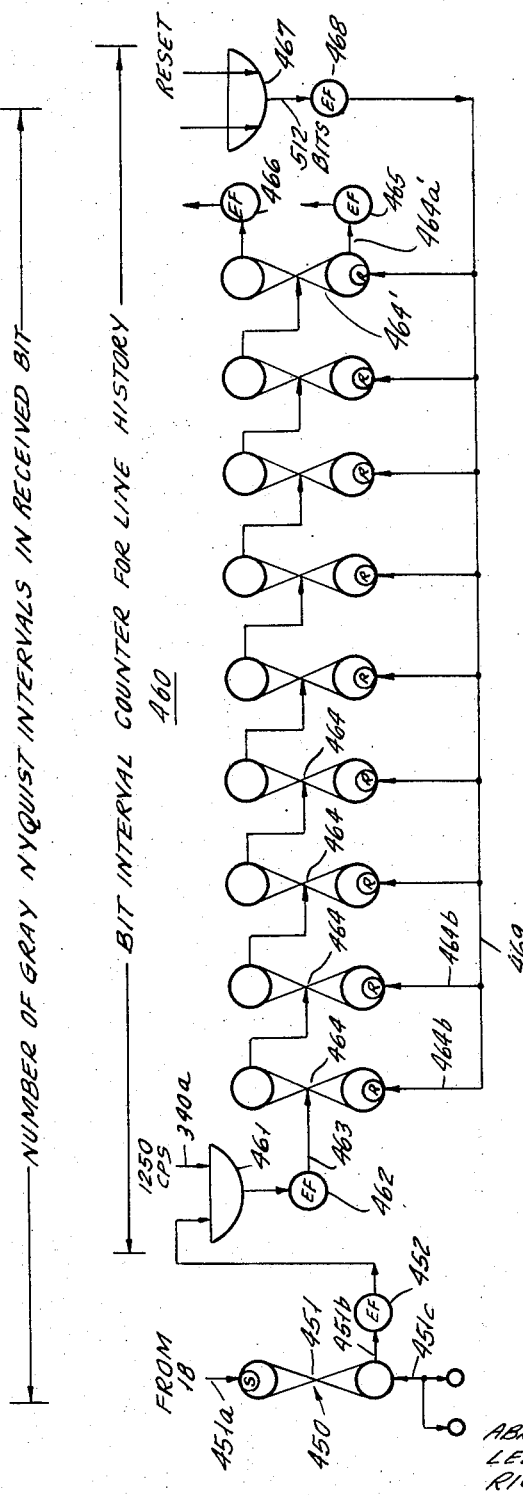
FIG. 10.
INVENTORS
ABRAHAM BROTHMAN
LEE HOROWITZ
RICHARD D. REISER
ELSA HOROWITZ
OSTROLENK, FABER, GERB & SOFFEN
ATTORNEYS

FIG. 14.

United States Patent Office 3,349,371
Patented Oct. 24, 1967

3,349,371
QUATERNARY DECISION LOGIC
Abraham Brothman, Dumont, Lee Horowitz, Cedar Grove, Richard D. Reiser, Waldwick, and Elsa Horowitz, Cedar Grove, N.J., assignors, by mesne assignments, to Sangamo Electric Company, Springfield, Ill., a corporation of Delaware
Filed Nov. 20, 1963, Ser. No. 324,956
18 Claims. (Cl. 340—146.1)

ABSTRACT OF THE DISCLOSURE

This invention teaches an error monitoring circuit for communications systems and the like for making adjustments in coding arrangements and bit transmission rates through the advent of examining predetermined discrete intervals of a binary bit transmitted to determine the state of each interval. Each interval is categorized as being a clear binary ONE or a clear binary ZERO, a gray or ambiguous binary ONE or a gray or ambiguous binary ZERO. In addition thereto an initial determination of the state of the received bit is made and these examinations are employed as criteria in determining finally whether the binary bit received and examined should be classified as either a clear, gray or a totally valueless bit. This information is employed in addition to redundancy techniques such as parity check bits for the purpose of counting the number of gray bits per character, the number of error characters and the number of gray bits transmitted over a predetermined interval so as to continuously monitor and update the link history. The link history is employed to automatically increase and/or decrease bit transmission rates and code redundancy patterns as a result of the link history. The use of the quaternary decision logic technique, i.e., of tagging each binary bit as being clear or gray or totally in error provides an additional error detection and error correction capability not heretofore possible in conventional systems which employ only the redundancy coding techniques for use in error detection and error correction.

---

This invention relates to communications systems and more particularly to a novel means for use in communications systems to perform error correction and detection upon digital data being received and which is further capable of responding to changing link conditions within the system by means of automatic accommodations in bit transmission rate and coding.

The need for accuracy in data transmission is a well established one. With the coming of the era of business machine to business machine conversations and centralized automated dispatch of electric and gas distribution systems, to name just a few, the need for accuracy has heightened and has been joined with the need for maximum data speeds. The redundancy of language permits the deciphering of telegraphy messages that are 60% errored. No such luxuries exists when data is being fed into a business machine or used to dispatch a utility system. Such electronic data users demand character error rates well under one errored character per million received and when such accuracies are accompanied by efforts to reach the theoretical limits of a link speed capabilities a unique problem arises for which the classic array of equipment is an insufficient answer.

Some of the present day solutions to these problems are comprised of attaching a single bit or a plurality of bits to the bits of a coded character, which attached bits are known as redundancy bits, for the purpose of providing a system with error detection and/or error correction capabilities. As one example, a parity bit (which is one form of a redundant bit) may be attached to a coded character to identify the even parity of the transmitted coded character. Some other coded techniques presently employed are those of employing a plurality of parity check bits as redundant bits which are functionally related to some, but not necessarily all, of the coded bits of a character. For example, in a coded character comprised of four binary bits, a first parity bit may be generated as a function of the first and second binary bits of the character, while a second parity bit may be a function of the third and fourth binary bits of the character. Parity is one rule of generating a redundant bit wherein the code bits to which it is related summed with the parity bit results in either an odd or even sum. Still another effective coding technique is the Hamming coding technique which has both error detection and error correction capabilities. A detailed description of the Hamming coding technique is found in the Bell System Technical journal, volume 26, No. 2, April 1950, pages 147–160, entitled, "Error Detecting and Error Correcting Codes," by R.W. Hamming.

In spite of the coding techniques employed and the number of redundancy bits utilized in the coding technique, all of these codes are still susceptible to errors both within and beyond their error correction and error detection capabilities. Regardless of which coding technique is ultimately employed, present day systems decode the data bits of received characters in order to determine their binary state. Upon receipt of the complete coded character, all of the binary bits comprised of both the information bits and the redundancy bits are then examined to determine the correctness of the coded character received. This type of examination is in effect giving each of the received bits equal weight or significance in the interpretation of the coded character causing the error detection (and error correction, if present) circuitry of the receiver facility to remain a "blind" captive of the instantaneous conditions, exerting only whatever intrinsic protection is offered by the coding system.

The crux of the matter is the creditability of any received bit. Before a code or redundant bit is sent, there is an a priori probability "$p$" that the bit will be errored. The quantity "$p$" is assumed equal for all bits. Suppose a bit is received, and, depending upon the Nyquist Interval composition of the bit, there is some a posteriori probability that the state of the bit received is identical to the state of the bit sent. The two probabilities are in general not equal. Present systems, however, are not sensitive to the a posteriori probability of a bit error, and assume that all received bits are equally likely to be correct.

The instant invention avoids the "equal weight" principle by measuring the signal-to-noise and the pulse duration of noise quantities in order to incorporate this information into error detection and correction judgments. The measurement of the above data, in addition to the error detection and/or error correction capabilities of the transmission code itself, further enhances error correction and detection techniques to improve the reliability of data received to a remarkably high degree. The information derived is employed for the purpose of performing constant surveillance on the noise phenomenon present in the data being transmitted in order to make rapid determinations of the need for shifting to different coding techniques or different transmission speeds, or both. Strictly speaking, one cannot measure signal-to-noise ratio without a priori knowledge of either signal power or of noise power. What the instant invention does, is to "measure" "$p$," the a priori probability of a bit error, to within a statistically justifiable error with a small probability of being mistaken. With "$p$" known, the system surmises the value of $S/N$, the signal-to-noise ratio. This is possible because "$p$" is a function of $S/N$. In summary: the system determines statistically a quantity ($p$) which is a function of $S/N$. In practice, what the system does is as good as measuring $S/N$.

The instant invention is comprised of first means for receiving information transmitted by any suitable carrier. Depending upon the type of carrier employed, the receiver may be of the frequency shift, phase shift, or amplitude modulation type, to cite a few possible choices. The carrier employed may either be radio or high frequency wave propagation or cable, such as for example, telephone lines. Receiver means extracts the data from the modulated carrier [if such a carrier is employed] by extracting the information signal with whatever noise modulation it contains after performing filtering and limiting operations upon incoming signals. The signal at this time then consists of information plus the in-band components of link noise. The limiting action applies whatever gain is required to provide a constant R.M.S. signal voltage output. The information signals with the in-band components of noise are then impressed upon discriminating circuits provided for the purpose of determining the binary state of each bit of incoming information. The discriminating circuits are provided with demodulation means for making the ultimate decision as to the identity of each incoming bit.

The outputs of the discriminating circuits, before passing through the demodulation means, are impressed upon the quaternary decision logic circuitry. The quaternary decision logic circuitry divides the bit duration of each data bit into a plurality of equal intervals. Each interval is then examined to determine whether it is binary one, binary zero or "gray" (i.e., ambiguous).

The demodulator circuit examines the entire data bit to determine whether the data bit is to be classified as either binary one or binary zero. The two examining operations are combined to classify each interval as being one of four possible conditions: binary one-not gray ("1"); binary one-gray ("G1"); binary zero-gray ("G0"); and binary zero-not gray ("0"); thus establishing a four level classification of intervals of each bit.

The total number of intervals in each data bit are then tabulated and measured against predetermined statistical standards to establish each received bit as being either binary one, binary zero, or gray.

The decision generated by the quaternary decision logic then accompanies the decision performed by the demodulator circuit which determines the binary state [i.e., binary one or binary zero] of the incoming bit, such that each incoming bit is now tagged by an associated bit generated by the quaternary decision logic which further aids in the determination of the correctness of each received bit.

The output of the quaternary decision logic circuitry is then injected upon decision making circuitry, the decision of which is based upon statistical theory, which circuitry is employed to make the decisions as to whether a change in coding technique or transmission bit rate is required by means of compiling a link history of the incoming data.

The statistically based decision circuitry is designed in accordance with the needs and desires of the particular application in which the quaternary decision logic is to be employed.

The use of a coding technique which employs a larger amount of redundant bits, that is, the number of binary bits over and above the binary bits used to represent the character being transmitted, which redundant bits are employed for the purpose of detecting and/or correcting transmission errors, results in a larger degree of reliability for the transmission of data. In the case of bit speed optimization, reductions in bit speed have the effect of increasing the signal-to-noise ratio. Thus, by determining through statistical theory the probability of errors of evasion which may occur, it may be readily determined what bit speeds and coding techniques will give the desired degree of reliability required by the user, dependent upon the history of link conditions.

For example, if it is desired to transmit data having a reliability such that one character error per million characters transmitted is the desired reliability of the circuit, with this selection being made, it is then possible through the probability theories of statistics to determine that number of characters which contain errors lying in each of the multi-threshold levels described previously, which when exceeded will justify a change in either coding technique, bit speed or both, due to the data implied through a surveillance of the link history. Thus, when any one, or all, of the levels of errors per total characters received exceeds the preset limits, the decision logic based on such statistical theories operates to indicate the need for a change in either bit speed, or coding techniques, or both. Such bit speed and/or coding technique request signals are then impressed upon the receiver location transmitter facility which transmits signals to the location transmitting the data information to request such speed rate and/or coding technique changes in order to maintain the reliability of the system in the face of present state of the link history. The location originally transmitting the data may then automatically adjust itself to a new bit speed and/or coding technique so as to maintain the desired reliability of the system.

The use of the quaternary decision logic also permits error correction capabilities when utilizing codes which normally do not have such error correction capabilities. For example, when transmitting data by means of a coding technique which has no error correction capabilities, let it be assumed that the coding technique being employed is capable of localizing the probable error to a specific bit position of the code. With the use of the quaternary decision logic, if this same bit has been tagged as a gray bit by means of the quaternary decision logic, it is possible to correct the single bit which is tagged as a gray bit if the recent statistics show that the gray bits incidence has been acceptably low. Thus it can be seen that through the use of a quaternary decision logic circuit together with suitable decision making circuitry for compiling a history of link conditions, the error detection and correction capabilities of the transmission is enhanced remarkably. When coupled with these improvements the system also has the capability of shifting or changing to different coding techniques and/or bit speed transmission rates in order to substantially continuously maintain the transmission and reception of data at a predetermined reliability level.

It is therefore one object of the instant invention to provide a communications system receiver facility with novel quaternary decision logic for enhancing the error correction and/or error detection capabilities of a communications network.

Another object of the instant invention is to provide a communications system receiver facility with quaternary decision logic circuitry which is designed to generate a signal for an associated incoming binary bit which tags the received bit as being "gray" or "not gray."

Still another object of the instant invention is to provide a novel quaternary decision logic circuit for a receiver facility which contains a plurality of threshold levels for determining the "grayness" of incoming binary bits.

Still another object of the instant invention is to provide a novel quaternary decision logic circuit for transmission receiver facilities which is designed to determine the "grayness" of incoming binary bits and for further providing electronic circuit means for developing a link history of the communications system in order to maintain the reliability of received information at a preset level.

Still another object of the instant invention is to provide a communications system capable of operating at a plurality of bit speed transmission rates wherein quaternary decision logic and link history circuitry are employed for controlling the transmission rate of the communications system in accordance with the condition of the link in order to maintain a predetermined reliability level of incoming information.

Still another object of the instant invention is to provide a communications system capable of transmitting data in any one of a plurality of different coding techniques wherein the receiver facility is provided with quaternary decision logic and link history circuitry which controls the coding technique employed by the system at any given instant in accordance with the link history of the system so as to maintain the reliability of received data at a predetermined level.

These and other objects of the instant invention will become apparent when reading the accompanying description and drawings in which:

FIGURE 2a shows the quaternary decision circuit of FIGURE 2 in greater detail.

FIGURE 7 is a block diagram of the phase shift receiver employed with the quaternary decision logic of FIGURE 2.

FIGURE 8 shows a plurality of waveforms useful in explaining the operation of the receiver of FIGURE 7.

FIGURES 9 through 13 are logic diagrams showing peripheral circuitry of the quaternary decision circuit of FIGURE 2a and showing portions of the decision making circuitry of FIGURE 3 in greater detail.

FIGURE 14 is a chart employed for describing the operation of the logic circuits of FIGURES 2a and 9 through 13.

GENERAL THEORY

Figure 1:
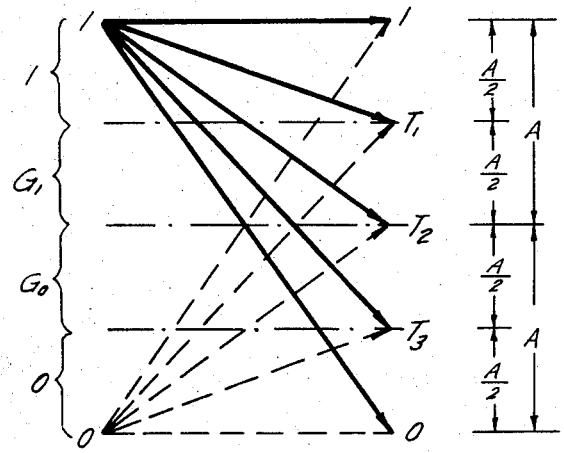
FIGURE 1 is a plot employed for the purpose of explaining the principles of the quaternary decision logic.

The criteria of evaluation of any coding system are:

(i) the distance property of the code, $n_d$
(ii) the error detection radius of the code, $r_d$
(iii) the error correction radius of the code, $r_c$
(iv) the susceptibility of the code to direct errors-of-evasion, $P_{CEE}$
(v) the susceptibility of the code to spurious correction, $P_{CE}$ The distance property $n_d$ is the minimum number of bit-positions by which any two character codes differ. The $n_d$-property of a code is illustrated in Table 1 for the case of a numeric 1-2-4-8 code. Here, it will be observed that the code for:

| | |
|---|---|
| 0 & 1 | 8 & 9 |
| 0 & 2 | 8 & 10 |
| 1 & 3 | 10 & 11 |
| 2 & 3 | 12 & 13 |
| 4 & 5 | 12 & 14 |
| 4 & 6 | 14 & 15 |
| 6 & 7 | | differ by only 1 bit-position. Therefore, the $n_d$-property for the Table 1 code is one bit.

TABLE 1

| | 1 | 2 | 4 | 8 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

The practical significance of this fact is that without "a priori" knowledge of a character, a singlet bit error would suffice for an undetectable character-error.

If a single bit of redundant information is added to the code in Table 1 according to even parity rules, a code such as that shown in Table 2 is obtained.

TABLE 2

| | 1 | 2 | 4 | 8 | P | |
|---|---|---|---|---|---|---|
| 0 | 0 | 0 | 0 | 0 | 0 | |
| 1 | 1 | 0 | 0 | 0 | 1 | |
| 2 | 0 | 1 | 0 | 0 | 1 | |
| 3 | 1 | 1 | 0 | 0 | 0 | |
| 4 | 0 | 0 | 1 | 0 | 1 | |
| 5 | 1 | 0 | 1 | 0 | 0 | |
| 6 | 0 | 1 | 1 | 0 | 0 | Single |
| 7 | 1 | 1 | 1 | 0 | 1 | Parity |
| 8 | 0 | 0 | 0 | 1 | 1 | Protected |
| 9 | 1 | 0 | 0 | 1 | 0 | Code |
| 10 | 0 | 1 | 0 | 1 | 0 | |
| 11 | 1 | 1 | 0 | 1 | 1 | |
| 12 | 0 | 0 | 1 | 1 | 0 | |
| 13 | 1 | 0 | 1 | 1 | 1 | |
| 14 | 0 | 1 | 1 | 1 | 1 | |
| 15 | 1 | 1 | 1 | 1 | 0 | |

Checking the same numeric characters listed above for the case of the Table 1 code, it will now be seen that the comparable codes in Table 2 differ by two bit-positions. Therefore, the $n_d$-property for the Table 2 code is two bits. Because the Table 2 code has a distance property of two bits, any singlet bit-error is now detectable; and, for an evading error to occur, a minimum of two errored bits must occur. For example, if the correct code for the numeric character 4 is subjected to error as indicated below:

| 1 | 2 | 4 | 8 | P | |
|---|---|---|---|---|---|
| 0 | 0 | 1 | 0 | 1 | correct code |
| 0 | ① | 1 | 0 | 1 | errored code | parity checking logic will reject the character since the even parity conditions are not met. If two binary "1" bits are added or one is added and one is lost, however, the parity conditions will have been met and the errored character will evade the detection scheme.

These illustrations suffice to generalize the fact that the purpose of redundancy [i.e., the use of redundant code bits] is to increase the distance property of the code. Indeed, as the amount of redundancy is increased, one or both of two goals is accomplished: error-detection capabilities are built up; and/or error-correction capabilities are obtained. Error detection implies an ability to detect a logical inconsistency between the information-set of a code and its redundancy set. Error detection does not include, however, any attempt to salvage the information in the errored code. By contrast, error correction is a process by which an attempt is made to salvage the information in an errored character. Since both the error detection and error correction capabilities of a code are a function of the amount of redundancy in a code [and the efficiency of the redundancy rules], codes are also identified according to their error detection radii and their error correction radii. The error detection radius $r_d$ of a code is the maximum number of errored bits it will *always* detect. The error correction radius $r_c$ of a code is the maximum number of errored bits it can contain and still retain unambiguous recognition of the intended information. Applied to the code in Table 1, the $r_d$-characteristic is zero, as is also its $r_c$-characteristic. Applied to the code in Table 2, the $r_d$ characteristic is one, while the $r_c$=characteristic is still zero. Consider now the Bina-metic code of Table 3 where the first redundant bit is an even parity function as before and the second redundant bit is an even parity function of bits one and three. If we now apply the criteria of evaluation, we find that, despite the addition of a second redundant bit, the code still has a distance property of two and an $r_d$-characteristic of one and an $r_c$-characteristic of zero. Offhand, it would then seem that the increase in amount of redundancy has afforded no advantage whatsoever. In fact, however, the codes in Tables 2 and 3 differ in another parameter, their susceptibility to direct errors-of-evasion. The susceptibility of a code to errors-of-evasion is mathematically defined by a power series of the form:

$$P_{CEEE} = C_1 p^{n_d} + C_2 p^{n_d+1} + C_3 p^{n_d+2} + \ldots + C_n p^n$$

where:

$p$ = the probability of a bit error $C_1$, $C_2$, $C_3$, etc. are fixed coefficients
$P_{CEEE}$ = probability of a character level error
$n_d$ = code's distance property
$n$ = number of bits per character

TABLE 3.—BINA-METIC NUMERIC CODE

|    | Information Set |   |   |   | Redundancy Set |   |
|----|---|---|---|---|-----|-----|
|    | 1 | 2 | 4 | 8 | $R_1$ | $R_2$ |
| 0  | 0 | 0 | 0 | 0 | 0 | 0 |
| 1  | 1 | 0 | 0 | 0 | 1 | 1 |
| 2  | 0 | 1 | 0 | 0 | 1 | 0 |
| 3  | 1 | 1 | 0 | 0 | 0 | 1 |
| 4  | 0 | 0 | 1 | 0 | 0 | 1 |
| 5  | 1 | 0 | 1 | 0 | 0 | 0 |
| 6  | 0 | 1 | 1 | 0 | 0 | 1 |
| 7  | 1 | 1 | 1 | 0 | 1 | 0 |
| 8  | 0 | 0 | 0 | 1 | 1 | 0 |
| 9  | 1 | 0 | 0 | 1 | 0 | 1 |
| 10 | 0 | 1 | 0 | 1 | 0 | 0 |
| 11 | 1 | 1 | 0 | 1 | 1 | 1 |
| 12 | 0 | 0 | 1 | 1 | 1 | 1 |
| 13 | 1 | 0 | 1 | 1 | 1 | 1 |
| 14 | 0 | 1 | 1 | 1 | 1 | 1 |
| 15 | 1 | 1 | 1 | 1 | 0 | 0 |

Bit #1 #2 #3 #4

In concept, $P_{CEE}$, the susceptibility to direct character errors, is the probability of a character level error-of-evasion when the number of bit-errors equals or exceeds the code's distance property. Because the probability of bit errors equal to the code's distance property is far greater than any higher number of bit errors in any single character, $P_{CEE}$ is for all practical purposes defined by the first term of the power series, and hence.

$$P_{CEE} \approx C_1 p^{n_d}$$

For the code in Table 2, $P_{CEE}$ has a value of $10p^2$, while the code in Table 3 has a $P_{CEE}$-value of $4p^2$. The improvement which is obtained from the second redundant bit in Table 3 is therefore a 10:4 reduction in the probability of a character level evading error.

The fact that the more secure of the two codes in the cases of Table 2 and Table 3 still has no correction radius is demonstrated as follows. Let the code for the numeric character 10 be errored as indicated below:

|        | 1 | 2 | 4 | 8 | $R_1$ | $R_2$ |   |
|--------|---|---|---|---|----|----|---|
| Error→ | 0 | 1 | 0 | 1 | 0 | 0 | correct code |
|        | ① | 1 | 0 | 1 | 0 | 0 | singlet errored code |

Recognition of the information in the errored code will then depend on a comparison of the errored code [which would be declared in error by the error detection hardware employed because it fits no format in Table 3] with all other codes. If the comparison is made, assuming a single bit error, it will be found that the errored code is "one-bit distant" from the codes for decimal numbers 10 and 15. In the face of such an ambiguity, the information must be regarded as lost, and since any one-bit error will produce such an ambiguity, the $r_c$-characteristic of the code is zero.

In Table 4, there is illustrated a numeric code with $n_d=3$, $r_d=2$, $r_c=1$ and $P_{CEE}=7p^3$. In this case:

(a) $R_1$ is an even parity function of bits 1, 2 and 3
(b) $R_2$ is an even parity function of bits 2, 3 and 4
(c) $R_3$ is an even parity function of bits 1, 2 and 4

The code of Table 4 is a Hamming code having error correction capabilities, which code is fully described in U.S. Patent No. 2,552,629, entitled "Error Detecting and Correcting System," issued May 15, 1951 to R. Hamming. This patent provides a detailed description of the Hamming coding technique.

TABLE 4.—HAMMING 3-BIT REDUNDANCY NUMERIC CODE

|    | Information Set |   |   |   | Redundancy Set |   |   |
|----|---|---|---|---|----|----|----|
|    | 1 | 2 | 4 | 8 | $R_1$ | $R_2$ | $R_3$ |
| 0  | 0 | 0 | 0 | 0 | 0 | 0 | 0 |
| 1  | 1 | 0 | 0 | 0 | 1 | 0 | 1 |
| 2  | 0 | 1 | 0 | 0 | 1 | 1 | 1 |
| 3  | 1 | 1 | 0 | 0 | 0 | 1 | 0 |
| 4  | 0 | 0 | 1 | 0 | 1 | 1 | 0 |
| 5  | 1 | 0 | 1 | 0 | 0 | 1 | 1 |
| 6  | 0 | 1 | 1 | 0 | 0 | 0 | 1 |
| 7  | 1 | 1 | 1 | 0 | 1 | 0 | 0 |
| 8  | 0 | 0 | 0 | 1 | 0 | 1 | 1 |
| 9  | 1 | 0 | 0 | 1 | 1 | 1 | 0 |
| 10 | 0 | 1 | 0 | 1 | 1 | 0 | 0 |
| 11 | 1 | 1 | 0 | 1 | 0 | 0 | 1 |
| 12 | 0 | 0 | 1 | 1 | 1 | 0 | 1 |
| 13 | 1 | 0 | 1 | 1 | 0 | 0 | 0 |
| 14 | 0 | 1 | 1 | 1 | 0 | 1 | 0 |
| 15 | 1 | 1 | 1 | 1 | 1 | 1 | 1 |

The distance characteristic of 3 flows from the triple-weighting of bit #2. The $r_d$-parameter then follows from the relationship between $r_d$ and $n_d$ which is $$r_d = n_d - 1$$

for all coding systems. As for the $r_c=1$ parameter of the Table 4 code, it will be observed that if any character code is errored in just one bit position:

(i) the nearest approach to any incorrect characters would be "2 bit-positions distant" in view of the code's distance property, $n_d=3$
(ii) only one code, the true and correct code, would be "1 bit-position" distant from the errored code.

There remains but one coding parameter which need be explored, namely the susceptibility of an error correcting code to erroneous correction. The number of errored bits per character, $n_e$, at which a spurious correction will occur is such that:

$$n_e \geq n_d - r_c$$

The susceptibility of the code to spurious correction is the probability of making $n_e$ errors in the transmission of a single character. Mathematically, this probability is:

$$\frac{n!}{(n-n_e)!n_e!} p^{n_e} = P_{CE}$$

where $n$=total number of bits in a character.

In addition to the coding system referred to as the Bina-metic Parity System illustrated in Table 3, as an alternative embodiment a three-way manual selection between Hamming 2-Bit Redundancy, Hamming 3-Bit Redundancy and Hamming 4-Bit Redundancy codes may be provided in the communications system. Hamming 2-Bit Redundancy coding is illustrated in Table 5. Hamming 4-Bit Redundancy coding is shown in Table 6. Hamming 2-Bit Redundancy coding uses two redundancy bits according to rules which make:

(i) the $R_1$-bit an even parity function of information-bits #1, 2 and 3
(ii) the $R_2$-bit an even parity function of information-bits #2, 3 and 4

TABLE 5.—HAMMING 2-BIT REDUNDANCY NUMERIC CODE

| | Information Set | | | | Redundancy Set | |
|---|---|---|---|---|---|---|
| | 1 | 2 | 4 | 8 | $R_1$ | $R_2$ |
| 0 | 0 | 0 | 0 | 0 | 0 | 0 |
| 1 | 1 | 0 | 0 | 0 | 1 | 0 |
| 2 | 0 | 1 | 0 | 0 | 1 | 1 |
| 3 | 1 | 1 | 0 | 0 | 0 | 1 |
| 4 | 0 | 0 | 1 | 0 | 1 | 1 |
| 5 | 1 | 0 | 1 | 0 | 0 | 1 |
| 6 | 0 | 1 | 1 | 0 | 0 | 0 |
| 7 | 1 | 1 | 1 | 0 | 1 | 0 |
| 8 | 0 | 0 | 0 | 1 | 0 | 1 |
| 9 | 1 | 0 | 0 | 1 | 1 | 1 |
| 10 | 0 | 1 | 0 | 1 | 1 | 0 |
| 11 | 1 | 1 | 0 | 1 | 0 | 0 |
| 12 | 0 | 0 | 1 | 1 | 1 | 0 |
| 13 | 1 | 0 | 1 | 1 | 0 | 0 |
| 14 | 0 | 1 | 1 | 1 | 0 | 1 |
| 15 | 1 | 1 | 1 | 1 | 1 | 1 |

Figure 4:
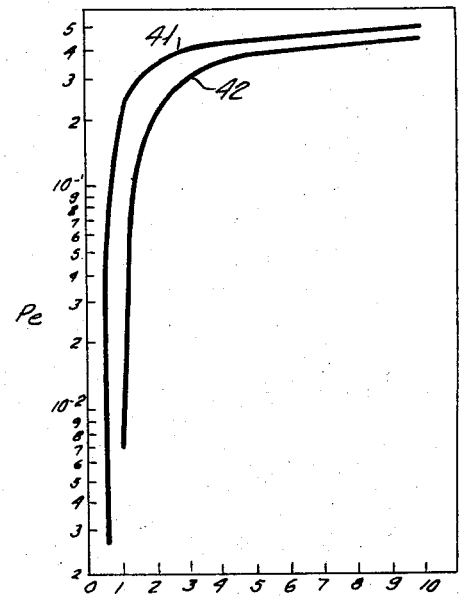
FIGURE 4 is a graph showing the probability of erroring an information bit plotted against the $\alpha$ parameter.

Here it will be observed that the $R_1$ and $R_2$ bits are identical to the $R_1$ and $R_2$ bits of the code in FIGURE 4.

In the case of Hamming 4-Bit Redundancy coding, shown in Table 6, four redundant bits are used. Of these, $R_1$ through $R_3$ are identical to $R_1$ through $R_3$ of Table 4. The fourth redundant bit, $R_4$, is generated as an even parity function of information-bits #1, 3 and 4. Thus, from Hamming-2 through Hamming-4 codes, the rules for redundant bits remain essentialy the following:

$$R_1 = f_e[b_1 b_2 b_3]$$
$$R_2 = f_e[b_2 b_3 b_4]$$
$$R_3 = f_e[b_1 b_2 b_4]$$
$$R_4 = f_e[b_1 b_3 b_4]$$

TABLE 6.—HAMMING 4-BIT REDUNDANCY NUMERIC CODE

| | Information Set | | | | Redundancy Set | | | |
|---|---|---|---|---|---|---|---|---|
| | 1 | 2 | 4 | 8 | $R_1$ | $R_2$ | $R_3$ | $R_4$ |
| 0 | 0 | 0 | 0 | 0 | 0 | 0 | 0 | 0 |
| 1 | 1 | 0 | 0 | 0 | 1 | 0 | 1 | 1 |
| 2 | 0 | 1 | 0 | 0 | 1 | 1 | 1 | 0 |
| 3 | 1 | 1 | 0 | 0 | 0 | 1 | 0 | 1 |
| 4 | 0 | 0 | 1 | 0 | 1 | 1 | 0 | 1 |
| 5 | 1 | 0 | 1 | 0 | 0 | 1 | 1 | 0 |
| 6 | 0 | 1 | 1 | 0 | 0 | 0 | 1 | 1 |
| 7 | 1 | 1 | 1 | 0 | 1 | 0 | 0 | 0 |
| 8 | 0 | 0 | 0 | 1 | 0 | 1 | 1 | 1 |
| 9 | 1 | 0 | 0 | 1 | 1 | 1 | 0 | 0 |
| 10 | 0 | 1 | 0 | 1 | 1 | 0 | 0 | 1 |
| 11 | 1 | 1 | 0 | 1 | 0 | 0 | 1 | 0 |
| 12 | 0 | 0 | 1 | 1 | 1 | 0 | 1 | 0 |
| 13 | 1 | 0 | 1 | 1 | 0 | 0 | 0 | 1 |
| 14 | 0 | 1 | 1 | 1 | 0 | 1 | 0 | 0 |
| 15 | 1 | 1 | 1 | 1 | 1 | 1 | 1 | 1 |

To place the Hamming-2 through Hamming-4 codes in focus in comparison with Single Parity [Table 2] and Bina-metic Parity [Table 3] codes, the following chart is offered.

CHART I

| | $n_d$ | $r_d$ | $r_c$ | $P_{CEE}$ | $n_2$ | $P_{CE}$ |
|---|---|---|---|---|---|---|
| Single Parity | 2 | 1 | 0 | $10p^2$ | | |
| Bina-metic Parity | 2 | 1 | 0 | $4p^2$ | | |
| Hamming-2 | 2 | 1 | 0 | $3p^2$ | | |
| Hamming-3 | 3 | 2 | 1 | $7p^3$ | 2 | $21p^2$ |
| Hamming-4 | 4 | 3 | 1 | $15p^3$ | 3 | $56p^3$ |

In Cart I, $p$ in columns [4] and [6] is the probability of a bit-error. In practice, $p$ is a function of the type of tone carrier equipment used and of five link disturbance parameters, namely white noise, impulse noise, dropout, burst noise and fading. Impulse noise and dropout are properly grouped together, and their influence on $p$ is shown in FIGURE 4 where the $p$ is plotted against a ratio quantity $[\alpha]$. In quantitative form, $[\alpha]$ is defined by:

$$\alpha = \frac{[\text{duration of the impulse or dropout}][\text{amplitude of the impulse or dropout}]}{[\text{duration of a signal bit}][\text{amplitude of the bit envelope}]}$$

Considering the plot of FIGURE 4, curve 41 represents the probability of erroring a bit versus the alpha parameter when a frequency shift communication system is employed. Curve 42 shows a similar plot when a phase shift communications system is employed.

It can be seen from both curves 41 and 42 of FIGURE 4 that as the ratio of impulse of dropout noise amplitude in time duration divided by the amplitude and time duration of the information bit increases, the probability of the impulse or dropout noise causing an erroring of the bit increases very abruptly until the curves reaches a substantial plateau in the region where the alpha parameter is equal to approximately 3.

White noise, burst noise and fading can be dealt with together through a ratio parameter which links these to the instantanous signal strength. This parameter is signal-to-noise ratio, and is the ratio of the RMS signal voltage to the RMS white noise voltage. "$p$" is shown in FIGURE 5 as a function of signal-to-noise ratio for the three main forms of tone carrier equipment.

Figure 5:
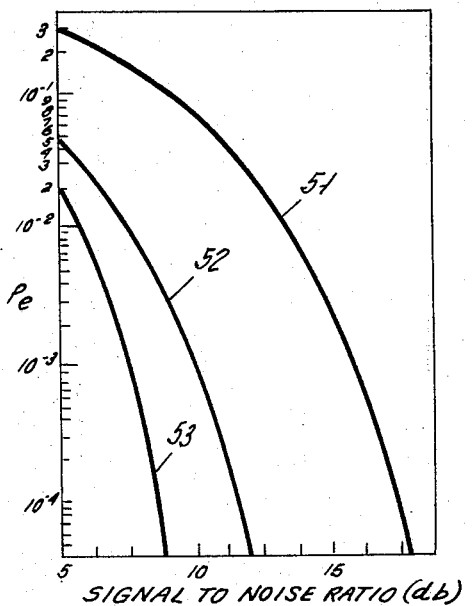
FIGURE 5 is a graph showing the probability of erroring an information bit plotted against the signal-to-noise ratio.

Considering FIGURE 5, curve 51 shows the plot of signal-to-noise ratio plotted in db's against the probability of erroring a binary bit when employing the *am* or amplitude modulation transmission mode. Curves 52 and 53 are similar plots which represent usage of the frequency shift and phase shift transmission modes respectively. Considering the amplitude modulation transmission mode, it can be seen that when the signal-to-noise ratio is high, say approximately 17.5 db, it can be seen that the probability of erroring a bit is $9 \times 10^{-5}$, which is quite low. However, as the signal-to-noise ratio diminishes to 5 db, for example, it will be noted that the probability of erroring a bit is $3 \times 10^{-1}$, which is quite high. Substantially similar results can be seen for the phase shift and frequency shift communication modes depicted by curves 52 and 53 respectively, but it can be seen that from the viewpoint of signal-to-noise ratio, the frequency shift communication mode is far superior to the amplitude modulation mode and likewise the phase shift communication mode depicted by curve 53 is superior to both the frequency shift and amplitude modulation operating modes. At any rate, it can clearly be seen that a shift or change in signal-to-noise ratio by as little as one db causes an extremely large jump in the probability of erroring a bit and it therefore becomes significant to show a deep concern for the signal-to-noise ratio of the system in determining the reliability of information being received.

*Quaternary decision logic*

The discussion, so far, stresses the function of coding as a barrier to link-induced error in data transmission.

The effectiveness of the barrier, it was indicated, is always reducible to the distance-property, $n_d$, of the code. In turn, it has been demonstrated that the distance-property of a code is a matter of the amount of redundancy *and* the efficiency of use of the redundancy. At any level of redundancy and any efficiency of use of the redundancy, any coding system has a susceptibility to evading errors [$P_{CEE}$] which was indicated to be a function of the probability of a bit-error [$p$]. The link performance parameter [$p$] is shown to be a function of two other link parameters, signal-to-noise ratio and an [$\alpha$]-parameter [see FIGURES 4 and 5]. As long as the error detection [and error-correction, if present] hardware of a data receiver is obliged to treat each received information-bit with "equal weight," it remains a "blind" captive of the instantaneous link conditions exerting whatever intrinsic protection is offered by the coding system. To escape the "equal weight" principle is to measure the signal-to-noise and [$\alpha$] parameters under which each bit is received, and to incorporate this data into the error detection and correction judgments. The measurement of the signal-to-noise and [$\alpha$]-parameter ambients for each bit is a capability of the quaternary decision logic.

The quaternary decision logic is based on the physics of noise-contamination of information, and as such uses the incidence of "gray"-bits to measure the probability of a binary inversion (i.e. a bit error). The basic quaternary decision logic operation is illustrated in FIGURE 1. In FIGURE 1 let:

(a) The line 1→1 represent the transmission of a binary "1"-bit under noiseless circumstances, and (b) The line 0→0 represent the transmission of a binary "0" under similarly noiseless circumstances.

In all forms of tone carrier equipment which may be employed, the line $T_2$ in FIGURE 1 is a threshold setting around which a "1" or "0" decision is made. This is to say, that if in the case of frequency shift or phase shift tone carrier equipment, the difference between the two discriminator outputs is in the direction of the 1→1 line relative to $T_2$ as zero-center, the bit is a "1"-bit; and conversely if the difference between the two discriminator outputs is in the direction of the 0→0 line from $T_2$ as a zero-center, the bit is a "0"-bit. Under these conditions, destructive noise in application to a "1"-bit reduces the "discriminator difference" from its uncontaminated amplitude [A] in the 1→1 direction to all levels of degradation inclusive of [A] amplitude in 0→0 direction. And, similarly, noise in application to a "0"-bit reduces the "discriminator imbalance" from its uncontaminated amplitude [A] in the 0→0 direction to all levels of degradation inclusive of [A] amplitude in the 1→1 direction. The Quaternary Decision Logic divides the whole binary "decision space" into four compartments each of which is [$A/2$] in amplitude-interval;

(i) a "1"-output space which lies between threshold $T_1$ and the 1→1 line (ii) a "gray-1" space, shown as $G_1$, which lies between the zero-center $T_2$ and $T_1$ (iii) a "gray-0" space, shown as $G_0$, which lies between the zero-center $T_2$ and threshold $T_3$ (iv) a "0"-output space which lies between $T_3$ and the 0→0 line Under this arrangement, if:

(A) [1/1] represents a "1"-bit being sent and received as a "1"-bit, this will occur if cancelling noise assumes any amplitude between zero and less-than-$A/2$ amplitude.

Figure 6:
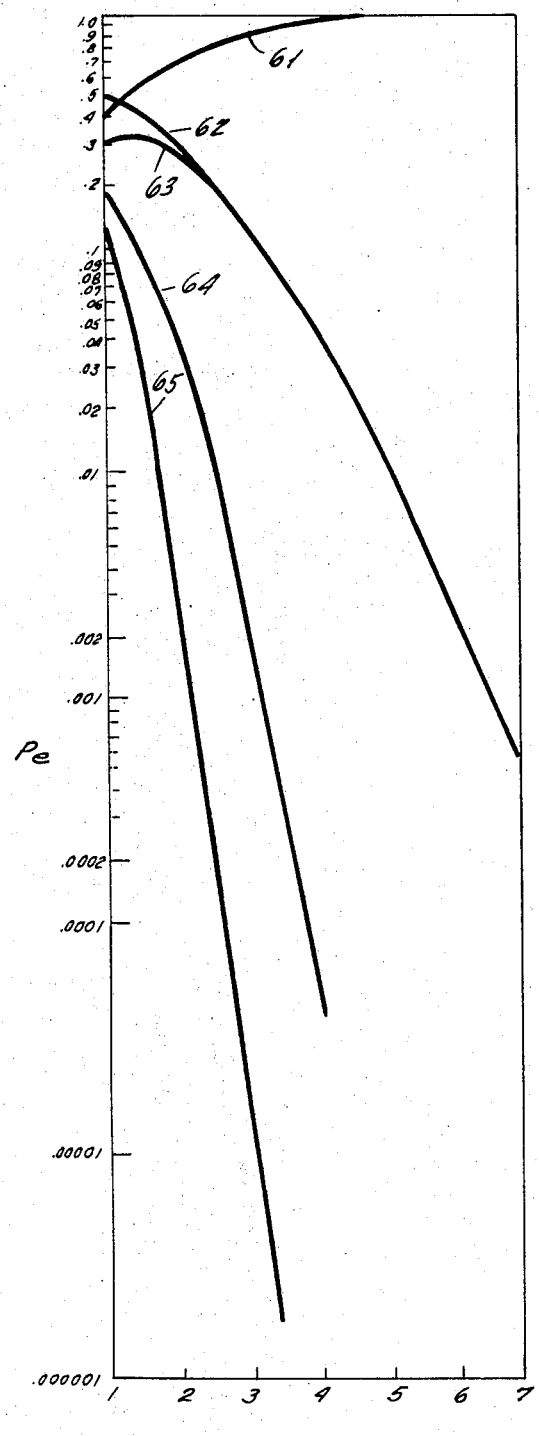
FIGURE 6 is a graph showing the probability of erroring an information bit for the different threshold levels of the quaternary logic plotted against the signal-to-noise ratio.

(B) [1/$G_1$] designates a "1"-bit which is received as a gray-"1," this will occur if cancelling noise assumes any amplitude between $A/2$ and less-than-A (C) [1/$G_0$] designates a "1"-bit which is received as a gray-"0," this will occur if cancelling noise assumes any amplitude between greater-than-A and less-than-$3A/2$ (D) [1/0] designates a "1"-bit which is received as a "0"-bit, this will occur if cancelling noise assumes any amplitude greater-than-$3/2A$ and $2A$ One could of course write the corresponding items to [A] through [D] above for the case of "0"-bits undergoing the same quaternary classifications of degradation, and if this were done [0/0], [0/$G_0$], [0/$G_1$] and [0/1] would respectively involve the same levels of cancelling noise. If the following grouping is done:

[1/1]+[0/0]=unequivocated information=$A_0$
[1/$G_0$]+[0/$G_1$]=equivocated - and - incorrect information . . . =$C_0$
[1/$G_1$]+[0/$G_0$]=equivocated - but - correct - information . . . =$B_0$
[1/0]+[0/1]=unidentifiably errored information=$D_0$ FIGURE 6 relates the frequency of the four classifications of events to link signal-to-noise conditions. Curve 61 of FIGURE 6 shows the probability of occurrence of unequivocated information $A_0$ plotted against the signal-to-noise ratio. Curve 63 shows the probability of an equivocated-but-correct-information bit plotted against signal-to-noise ratio and curves 64 and 65 show the probability of occurrence of equivocated-and-incorrect information $C_0$ and unidentifiably errored information $D_0$, respectively. Curve 62 shows a summation of the probabilities of equivocated-but-correct-information bit $B_0$ and an equivocated-and-incorrect information $C_0$ against signal-to-noise ratio. Thus the curve 62 gives the probability of the occurrence of any gray bit whether equivocated-and-correct or equivocated-and-incorrect plotted against signal-to-noise ratio.

Considering curve 61, it can be seen that the probability of receiving unequivocated information increases with an increase in signal-to-noise ratio. Considering the curves 62 through 65, it can be seen that the probability of an errored bit consequently decreases with an increase in signal-to-noise ratio. Of particular interest in FIGURE 6 is the ratio:

$$\frac{D_0}{B_0+C_0}=\frac{\text{errored bits}}{\text{"gray"-bits}}$$

and its relationship to signal-to-noise conditions. Since this ratio exists for all conceivable signal-to-noise conditions, any physical means of identifying the frequency of occurrence of "gray"-bits is also a means of identifying the incidence of errored information-bits and also a means of identifying the instantaneous link signal-to-noise conditions. In order to obtain the probability of the ratio $E_0$ for any given signal-to-noise ratio, this is done simply by locating the intersection of the signal-to-noise ratio with the curve 65 and taking off the probability reading by finding the intersection of this curve with the probability ordinate P. For the $B_0+C_0$ probability this may be taken off curve 62 in a like manner, then by dividing the probability of $P_{d0}$ by the probability of $B_0+P_{c0}$, this gives the probability of $P_{e0}$ which is the ratio of errored bits to gray bits.

Of even greater interest is another feature which will be more meaningful after the following description of the Quaternary Decision Logic hardware.

*Quaternary decision logic circuitry*

Figure 2:
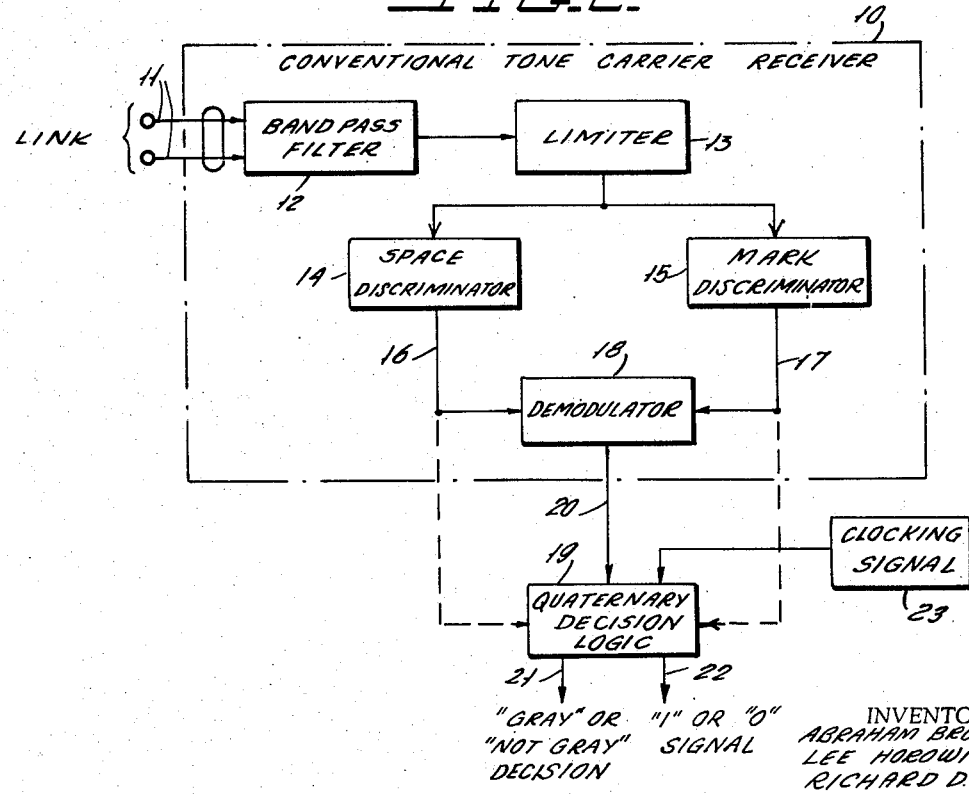
FIGURE 2 shows a block diagram of a communications system receiver facility designed in accordance with the principles of the instant invention.

FIGURE 2 illustrates the method of association of the quaternary decision logic with a conventional tone carrier receiver 10. Receiver 10 is provided with input terminals 11 for receiving incoming information from the communications link, which as previously described may be radio frequency waves propagated through the air, or a cable. Other propagation media may be provided, the one selected being dependent only upon the needs of the user. Incoming signals are impressed upon a bandpass filter 12 which receives the information signal with whatever noise modulation it may contain and which provides an output which consists of the information plus the in-band components of the link noise. The filtered signals are impressed upon a limiter circuit 13 which applies whatever gain is required to apply a constant RMS signal voltage to both the space and mark discriminators 14 and 15 respectively. The output signal from limiter 13 is an "ON" signal to one of the discriminators and an "OFF" signal to the other. In fact, however, the "ON" discriminator is engaged by the envelope of the noise modulated information and the "OFF" discriminator is engaged by the noise signal alone. The discriminators 14 and 15 employed in the tone carrier receiver 10 may be of the type described in copending U.S. application entitled Phase Shift Transmission System, bearing Ser. No. 301,110, filed Aug. 9, 1963, by A. Brothman et al. and assigned to the assignee of the instant invention. It should be understood that while the aforementioned pending U.S. application describes discriminators which may be used in conjunction with the instant invention, it should be understood that any other suitable discriminators may be employed.

The two discriminator outputs at 16 and 17 become the inputs to the receiver's demodulator circuit 18, which is also fully described in the above mentioned pending U.S. application, and also to the Quaternary Decision Logic 19. Demodulator 18 then makes the basic binary one or binary zero decision and submits it via the output 20 to the quaternary decision logic. The outputs 16 and 17 of space and mark discriminators 14 and 15 are impressed upon quaternary decision logic 19 which is comprised of a bridge type differential amplifier [not shown]. For the levels of imbalance between outputs 16 and 17 which would identify an unequivocated bit the bridge output is a 10 volt D.C. signal, for example. For a gray level of imbalance the bridge output is nearly zero voltage, for example, a bit clocking signal from clocking signal source 23 is impressed upon the quaternary decision logic 19 to indicate a bit sampling time. A bridge output of 10 volts D.C. results in the blocking of a gate through which the clocking signal must pass to set a "gray decision flip-flop," to be more fully described. A zero or nearly zero bridge output, on the other hand, opens the gate and permits the clocking signal to set the flip-flop. Accordingly, after a slight delay on the termination of the clocking signal, a "gray" or "not-gray" indication is available at output 21. As a corrolary action of the clocking signal the binary one or binary zero decision of the receiver's demodulator 18 is generated at output 22 as an accompanying signal indication to the output at 21. The four results are thus made possible at each bit interval: [1] "1"-not gray; [2] "0"-not gray; [3] "1"-gray; and [4] "0"-gray. Indeed a quaternary decision is thus produced.

FIGURE 2a shows the quaternary decision logic circuit 19 in greater detail. The circuit 19, shown in FIGURE 2a, is comprised of first and second input terminals 200 and 201, which are adapted to receive the outputs of the mark and space discriminators 14 and 15 of FIGURE 2 through their output leads 16 and 17. The signals generated at these outputs have the general appearance of the signals designated 234 and 235, it being noted that these signals are displaced in time relationship as to one another since the simultaneous occurrence of such signals would indicate the presence of both a mark and a space condition simultaneously which is not the case during normal operation thereof. These incoming signals are impressed respectively, upon the anodes of diodes 202 and 203 which are connected to the base electrodes of transistors 204 and 205 respectively. The second diodes 209 and 210, are also connected in common with the first diodes 202 and 203, respectively, and are adapted to receive a clock pulse input at the common terminal 209 for synchronization purposes. The simultaneous appearance of a clock pulse, together with one of the incoming mark or space conditions, causes conduction of one of the transistors 204 or 205, whose emitter electrodes are connected to the base electrodes of transistors 206 and 207, respectively. As the emitter electrode of one of the two transistors 204 or 205 goes negative, this causes conduction of its associated transistor 206 or 207, whose collector electrodes are connected to the inputs of the emitter followers 221a and 211b, respectively. The output of emitter follower 211a is simultaneously impressed upon AND gate 212 and OR gate 213 and the output of emitter follower 211b is also simultaneously impressed upon the inputs of AND gates 212 and 213. The operation is such that if a mark and a space condition are both present simultaneously, the inputs 200 and 201, this will cause binary one conditions to appear at the collector electrodes of transistors 206 and 207 and hence binary one conditions will appear simultaneously at the input to AND gate 212, thus generating a binary output which is passed through AND gate 212, emitter follower 214, OR gate 216 and emitter follower 217 to one input of AND gate 219. The second input of AND gate 219, which is a narrow clock pulse, to be more fully described, causes a binary one condition to pass through AND gate 219 and emitter follower 232 to provide a grayness indication. This is as it should be since simultaneous presence of a mark and space condition at input terminals 200 and 201 is indicative of an invalid binary bit.

It should also be noted that the output of emitter follower 217 is impressed through an inverter circuit to one input of an AND gate 220. Thus, in the case where AND gate 212 generates a binary one condition at its output, this is inverted to a binary zero condition preventing AND gate 220 from passing a binary one condition. AND gate 220, which acts as the not-gray indicator, therefore, fails to give a not-gray indication which is the case if simultaneous impression of mark and space conditions appear at the input terminals 200 and 201.

Considering now the case where the mark condition appears at the input terminal 200 and no signal appears at the input terminal 201. This causes the output of transistor 206 to go to the binary one level and the output of transistor 207 to go to the binary zero level. This impresses a binary zero and binary one condition respectively upon the inputs of AND gate 212 preventing it from generating an output. However, a binary zero and binary one condition at the inputs of OR gate 213 passes a binary one condition to the inverter 215. This is inverted to a binary zero condition which is then passed to OR gate 216, emitter follower 217, and AND gate 219. This disables AND gate 219 thereby preventing a grayness indication from being generated. However, this binary zero condition is simultaneously impressed upon inverter 218 which reconverts it to a binary one state, impressing it upon AND gate 220. This permits AND gate 220 to pass the binary one condition to generate a not-gray indication. This is a correct operation since the presence of a mark signal and the absence of a space signal is a valid condition.

Reversing the situation, when a space signal 235 is present and a mark signal 234 is absent, the operation is substantially similar with AND gate 212 being disabled and OR gate 213 being enabled to pass a binary one condition to inverter 215 which is inverted to a binary zero condition, preventing AND gate 219 from generating a grayness indication. However, a second inversion operation is performed by inverter 218, enabling AND gate 220 to generate a not-gray indication.

In order to further increase the accuracy of the grayness detector circuit 19, it is desirable to enable the AND gates 219 and 220 at the center of each mark or space signal which is generated. This center point is represented by the dotted line 236, shown in the wave diagram 235 of FIGURE 2a. The manner in which this center point pulse is located is by means of providing the clock pulse source 221, the output of which is converted by limiting means 222 to the square pulse output 222a. This output is first impressed upon an amplifier 224a and simultaneously therewith upon the input of inverter 223, the output of which is impressed upon a second amplifier 224b. The output waveforms appearing at the outputs of amplifiers 224a and 224b are such that as the square pulse is going positive at the output of 224a, the square pulse is going negative at the output of 224b and vice versa. This means that there is a positive going waveform at each half-cycle of the square wave which is available at the outputs of 224a and 224b. These waveforms are impressed upon an OR gate formed by diodes 225 and 226 having their cathodes collected in common and further connected to the base electrode of transistor 227. The transistor is connected in emitter follower fashion with its emitter electrode connected to the trigger input terminal of a one-shot multivibrator 228. As each positive going voltage signal is impressed upon the trigger input terminal 228a, a negative spike 228c is generated at the output terminal 228b. This terminal is connected through emitter follower 229 to the trigger input terminal 230a of a second one-shot multivibrator. The multivibrator 230 is triggered at the time $t_1$, shown in the waveform 228c. Thus, the one-shot multivibrator 228 acts as a delay means such that it is triggered at time $t_0$, shown in waveform 228a to form the negative square pulse which goes positive at time $t_1$ thereby injecting a time delay of length $t_1-t_0$. With the positive going portion of this negative pulse the one-shot multivibrator 230 is triggered and is designed to emit a pulse 230c at its output terminal 230b, having a one microsecond pulse width and occurring at the center of each half-cycle of the carrier signal generated by the clock pulse 221. This centering is performed by the delay provided by the one-shot multivibrator 228. Thus, each positive voltage spike generated by the one-shot multivibrator 230 is passed through emitter follower 231 and simultaneously impressed upon the AND gates 219 and 220, thus insuring the enablement of these AND gates at the center of each half-cycle of the carrier.

An illustration of the capabilities of the Quaternary decision is illustrated in Table 7. In Table 7, the top line gives the unerrored Hamming-2 coding for the decimal character 7.

TABLE 7

| Normal Hamming-2 Code for Decimal 7 | 1 | 1 | 1 | 0 | 1 | 0 |
|---|---|---|---|---|---|---|
| Typical Singlet Bit Error Code for Decimal 7 | ⊚↑ | 1 | 1 | 0 | 1 | 0 |
| Singlet Error | | | | | | |
| Typical Quaternary Decision Output for Decimal 7 | $G_0$ | 1 | 1 | 0 | 1 | 0 |

The middle line indicates the result of a singlet error at the $b_1$-position which results in a detectable error. Though the error is detectable, it is uncorrectable because the errored code is 1-bit distant from the codes for 6 and 7. The bottom line gives a possible form of the same error in the case of a quaternary output system, namely a gray-"0" in the $b_1$-position. The localizing of the probable error to the $b_1$-position of the code, taken with the fact that all other bit-positions are unequivocated, enables a correction with a high probability of being correct if the recent statistics of "gray"-bits incidence has been acceptably low. In this instance, the correction consists of the correction of the $G_0$ of the $b_1$-position to a "1," and the acceptance of the code as being that for a 7. The relationship of the correction-capability to the recent statistics of "gray"-bits incidence is discussed below under "Self-Optimizing Terminal Principles."

Most important in the case of Table 7 is the fact that the "quaternary decision principle" does give a correction capability to a code—in this case, the Hamming-2— which in and of itself has a zero correction radius [see Chart I].

*Self-optimizing terminal principles*

Self-optimizing involves an automatic accommodation of bit-speed and/or coding method to the instantaneous link-conditions to maintain a specified security condition at all times.

The need for shifting from one coding system to another as link performance changes is immediately justifiable. In terms of the groupings listed below, when the link performance is such that the frequency of $C_0$ and $D_0$ events is so low that the hazard of direct errors-of-evasion or of spurious correction by the use of "gray"-bit data in the case of Hamming-2 is less than the specified security level, the use of Hamming-3 or Hamming-4 would not be justified. Conversely, when the frequency of $C_0$ and $D_0$ events is high, Hamming-3 or Hamming-4 coding could well be the only means of assuring the specified security standard. Since the justified use of Hamming-2 amounts to a 16% improvement in data speed over Hamming-3 and a 33% improvement over Hamming-4, a clean-cut rationale for code optimization exists.

In the case of bit-speed optimization, it can be demonstrated that reductions in bit-speed have the effect of increasing signal-to-noise ratio. For instances of very low signal-to-noise ratio and high bit-rates, the improvement can, in fact, amount to very nearly a linear relationship between the duration of a bit and the effective signal-to-noise ratio.

To illustrate the methods of operation of a self-optimizing terminal, let a security level of one character error per $10^8$ characters be specified. In the use of Hamming-2, a hazard would then exist that two $C_0$ events could set up the circumstances of a direct error-of-evasion. Referring to Chart I, it can then be stated that if $P_{CEE}$ is set equal to $10^{-8}$ and $P_{C_0}$ designates the probability of a $C_0$ event, the maximum tolerable frequency for $C_0$ events would be $$\left[\frac{10^{-8}}{3}\right]^{1/2} = P_{C_0} = 5.76(10^{-5})$$

Consulting FIGURE 6, it is then seen that for $$P_{C_0} = 5.76(10^{-5})$$

the frequency of $B_0$ and $C_0$ events is 48 parts in a thousand and therefore, for consistency's sake, it would be a condition of the Terminal's operation that the use of Hamming-2 be discontinued at a measured "gray"-bits frequency equal to or greater than 48 "gray"-bits per 1000.

Let it be a further requirement of the Terminal during the period of Hamming-2 use that it control whether or not correction will occur in the case of a character code such as the third line of Table 7. Here, the character code would be rejected by Hamming-2 error detection, and the question of correction rests in the simplest instance with two alternative interpretations of the rejected character:

(i) that the single "gray"-bit is a $C_0$-event
(ii) that the single "gray"-bit is a $B_0$-event which is accomplished by a $D_0$-event in the first redundancy bit-position The interpretation in (i) is by far the likelier, and, were it accepted, the probability of errored correction would be the probability of interpretation (ii) being correct, which is $$\left[\frac{P_{B_0}P_{D_0}}{P_{B_0}P_{D_0}+P_{C_0}}\right]$$

Realizing that the situation in Table 7 will occur whenever Hamming-2 error detection rejects a character code with a single contained "gray"-bit, it is now clear that the holding of the $10^{-8}$ security level is indeed a matter of the product of two probabilities: the probability of an erroneous decision in any one case; and, the probability of meeting the specified situation. The probability of meeting the specified situation is:

$$6P_{C_0}+6P_{B_0}P_{D_0}$$

where: $6P_{C_0}$ = the probability of a single $C_0$-event in a 6-bit character; and, $6P_{B_0}P_{D_0}$ = the probability of a randomly located single $B_0$-event with an accompanying single $D_0$-event in a specified bit-position of a 6-bit character. For the general situation it then follows that:

$$(6P_{C_0}+6P_{B_0}P_{D_0})\frac{(P_{B_0}P_{D_0})}{P_{B_0}P_{D_0}+P_{C_0}} \lessapprox 10^{-8}$$

or $$6P_{B_0}P_{D_0} \leq 10^{-b8}$$

defines the circumstances under which such correction could be permitted. By FIGURE 6, such correction, for a $10^{-8}$ system security, would require that the "gray"-bits incidence be less or equal to 45 "gray"-bits per 1000. The Self-Optimizing Terminal could enforce this condition, and could request a repeat of the rejected character as long as the "gray"-bits frequency noted by the Terminal is such that the specified limit is exceeded.

Returning to the "gray"-bits frequency at which Hamming-2 coding is abandoned, let it be specified that Hamming-3 will be the alternate code. Perhaps, the first question relative to Hamming-3 would be whether or not to permit correction if a character-code contains a "gray"-bit. Noting that any combination of a $C_0$-event with a $D_0$-event will result in spurious correction, it will then be seen that for $10^{-8}$ security:

$$42P_{C_0}P_{D_0} = 10^{-8}$$

spells out the necessary relationships between $P_{C_0}$, $P_{D_0}$ and the specified security level. Applying this criterion to the "gray"-bits frequency condition at which the shift is made from Hamming-2 to Hamming-3, we find that at $P_{C_0} = 5.76(10^{-5})$, $P_{D_0} = 4(10^{-8})$. Since $$42P_{C_0}P_{D_0} = 42(5.76)(10^{-5})(4)(10^{-8}) = 9.69(10^{-11})$$

indicates an answer less than $10^{-8}$, Hamming-3 correction may be permitted at the code switching criterion. To determine the limit for Hamming-3 correction to codes containing 1 "gray"-bit per character, FIGURE 6 indicates that at a "gray"-bits frequency of 0.08 (i.e. 8 "gray"-bits per 100 bits):

$$P_{C_0} = 4(10^{-4}) P_{D_0} = 5.5(10^{-7})$$

and $$42P_{C_0}P_{D_0} = 42(4)(10^{-4}) \ldots (5.5)(10^{-7})$$
$$= 924(10^{-11}) = 0.924(10^{-8})$$

Accordingly, 8 "gray"-bits per 100 bits is the "gray"-bits frequency at which Hamming-3 correction would have to be discontinued for codes which contain one "gray"-bit per character. Hamming-3 correction could still be applied, however, above this limit to character codes which are received without "gray"-bit content.

To determine the limit for Hamming-3 correction to characters which do not contain "gray"-bits, we note that in the absence of "gray"-bits, the only mode for spurious correction is one in which two $D_0$-events occur in the same character. For this case, $21P_{D_0}^2 = 10^{-8}$ imposes the necessary relationship between D-events and the required security level. Solving this expression, we find that $$P_{D_0} = \sqrt{\frac{10^{-8}}{21}} = 2.18(10^{-6})$$

is the limiting condition in this case. Since $$P_{D_0} = 2.18(10^{-6})$$

where the "gray"-bits frequency is 10 "gray"-bits per 100 bits, Hamming-3 correction must be discontinued in all cases when this "gray"-bits frequency is exceeded.

To determine the "gray"-bits frequency at which the bit-rate must be lowered, we note that this limit would be reached when $7P_{C_0}^3 \leq 10^{-8}$ (i.e. when the Hamming-3 error detection capability leads to a direct errors-of-evasion probability which is greater than $10^{-8}$). Solving this expression, we find that when $$P_{C_0} = \left[\frac{10^{-8}}{7}\right]^{1/3} = 1.125(10^{-3})$$

this limit would occur. In summary, therefore, the conditions of operation of a $10^{-8}$ security level would then be the following:

(i) to permit correction of Hamming-2 character codes by "gray"-bit data until a "gray"-bits frequency of 45 "gray"-bits per 1000 is reached (ii) to permit use of Hamming-2 error detection until a "gray"-bits frequency of 48 "gray"-bits per 1000 is reached (iii) to shift to Hamming-3 coding when a "gray"-bits frequency of 48 "gray"-bits per 1000 is reached (iv) to permit Hamming-3 error correction in the case of characters containing a single gray-bit until a "gray"-bits frequency of 8 "gray"-bits per 100 is reached (v) to permit Hamming-3 correction in the case of characters which do not contain "gray"-bits until a "gray"-bits frequency of 10 "gray"-bits per 100 is reached.

In practice, it would be desirable to simplify the self-optimizing rules to reduce the complexity of the control hardware. Towards this:

(a) Items (i) to (iii) could be consolidated to permit Hamming-2 coding until a "gray"-bits frequency of 45 "gray"-bits/1000 is reached (b) Items (iv) and (v) could be consolidated to require a shift to a lower bit-rate when a "gray"-bits frequency of 10 "gray"-bits per 100 is reached.

Under conditions (a) correction to Hamming-2 codes by the use of "gray"-bit data could occur over the full range of use of Hamming-2 coding. And under condition (b) Hamming-3 correction permission would follow the rules in Item (iv) and (v).

Figure 3:
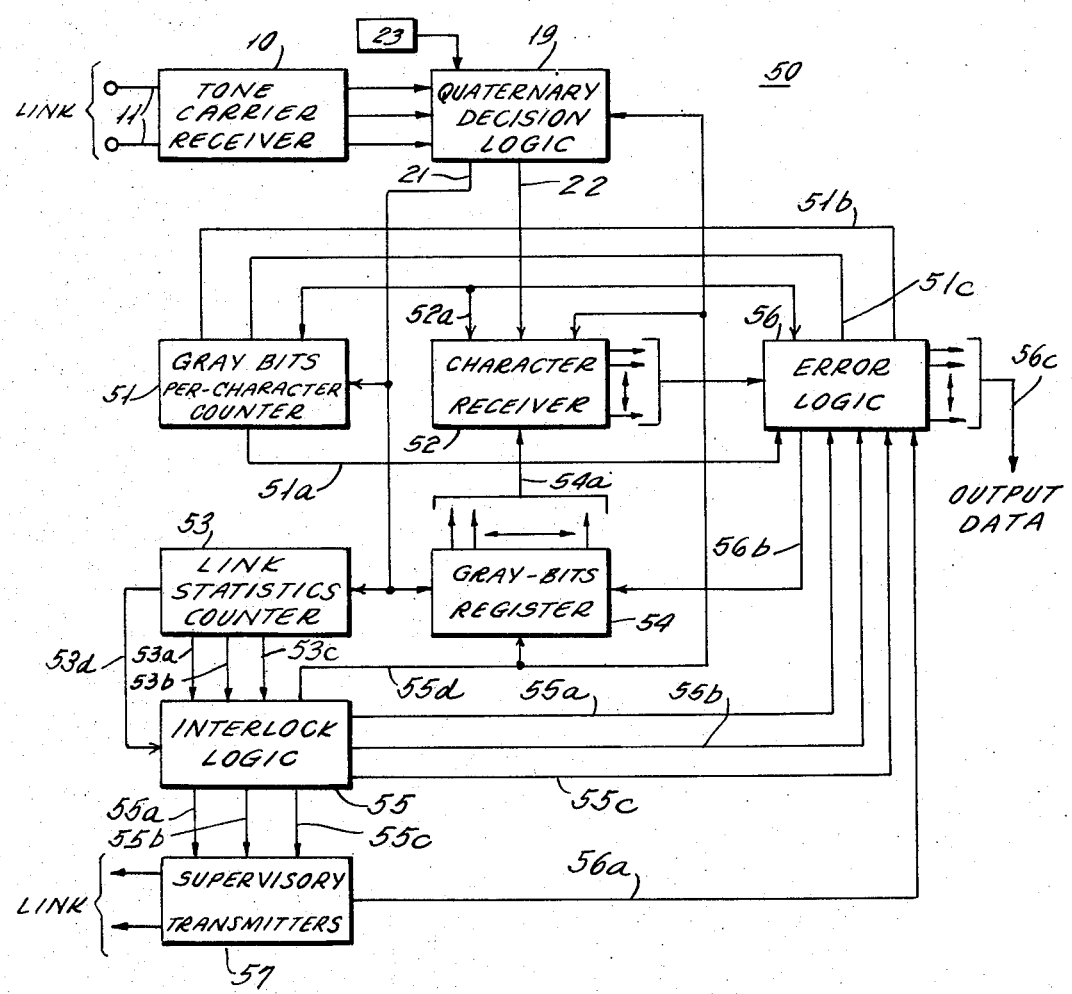
FIGURE 3 shows the decision making circuitry employed with the quaternary decision logic for the purpose of shifting the system to different bit rate transmission speeds and/or coding techniques in order to maintain the system at a predetermined level of reliability.

FIGURE 3 shows a block diagram of a self-optimizing terminal circuit 50 capable of carrying out the control actions set forth immediately above. As previously recited with respect to FIGURE 2 incoming signals are received at input 11 which are impresed upon the tone carrier 10. Tone carrier 10 operates the quaternary decision logic 19 in the same manner as previously described. The binary one or binary zero decisions available at output 22 of quaternary decision logic 19 are impressed upon character receiver 52 where the serialized bit information is collected in a suitable shift register means (not shown) for the purpose of error monitoring and a parallel hand-off of each character. The "gray" bit and "not gray" bit decisions available at output 21 of the quaternary decision 19 are impressed upon the gray bit per character counter 51, the links statistics counter 53; and gray bits register 54.

The links statistics counter 53 which is a suitable electronic multistage register provides "gray" bits frequency data for the past 1000 bits in terms of four binary outputs 53a through 53d respectively. Of these:

(i) signal 53a is in its "1"-state as long as—$0 \leq$ "gray"-bits per thousand bits $<45/1000$ (ii) signal 53b is in its "1"-state as long as—$45/1000 \leq$ "gray"-bits per thousand bits $<80/1000$ (iii) signal 53c is in its "1"-state as long as—$80/1000 \leq$ "gray"-bits per thousand bits $<100/1000$ (iv) signal 53d is in its "1"-state when "gray"-bits per $1000 > 100/1000$ and until the "gray"-bits frequency returns to 45/1000 as a maximum.

The above outputs are obtainable by providing a suitable multistage electronic counting means capable of accumulating a count-of-1000 and then automatically recycling to begin a new count. By connecting the output terminals 53a through 53d respectively, to selected output points of the register means these output terminals 53a through 53d will provide the necessary output signals as these statistical limits are exceeded.

Depending upon the status of signals on lines 53a through 53d as inputs to the Interlock Logic 55, the Interlock Logic exerts error detection and error correction mode control over the error logic 56 and bit clocking rate control over the quaternary decision logic 19, the character receiver 52 and the gray-bits register 54. Interlogic logic 55 is comprised of suitable logical gates which are employed to control the speed transmission rates which the system operates, depending upon the link history at any given instant. Gating circuits of this type are fully set forth in the copending aforementioned U.S. application entitled Digital Self-Optimizing Terminal filed May 9, 1963, Ser. No. 279,107, by A. Brothman et al. and assigned to the assignee of the instant invention. Control over the error logic is by signals on lines 55a through 55c. Control over the bit clocking rate is by signal line 55d. Signal line 55a enforces Hamming-2 error detection and secondary correction of Hamming-2 codes by "gray"-information. Signal 55b puts the error logic 56 into its Hamming-3 error detection mode. Signal 55c, in its "1"-state, permits Hamming-3 correction of codes containing one gray-bit; and, in its "0"-state, restricts such correction to codes containing no gray-bits. Signals 55d is the bit clocking source itself, and is the maximum clocking rate when signal 53d is in its "0"-state and the reduced rate when 53d is in its "1"-state.

The link statistics counter 53 also determines the commands which the interlock logic puts to the supervisory transmitters 57. Accordingly, when:
(i) signal 53a goes into its "1"-state, the supervisory transmitters receive a Hamming-2 keying command 55a
(ii) signal 53b goes into its "1"-state, the supervisory transmitters receive a Hamming-3 keying command 55b
(iii) signal 53d goes into its "1"-state, the supervisory transmitters 57 receive a low bit-rate keying command 55c The supervisory transmitters 57 are comprised of suitable transmission means for sending coded signals to the sending location from which the data being processed is received for the purpose of controlling the bit rate transmission speed and the coding technique which the sending location should employ in accordance with the link history at any given instant. A typical supervisory transmitter circuitry is fully set forth in the above mentioned copending U.S. application entitled Digital Self-Optimizing Terminal in which a combination of predetermined tones or frequencies are transmitted to the sending location, which combination of frequency signals is interpreted by the sending location for the purpose of making a speed and/or coding change due to changes in conditions of the link. The supervisory transmitters 57 are therefore the means of transmitting optimizing signalling to the sending end of the data transmission system.

With basic optimizing control in the hands of the link statistics counter 53, the next key hardware item is the gray-bits per character counter 51. This counter receives two inputs; a counting input via line 21 which is the "gray" bits output; and a reset input from the character receiver via line 52a. The signal on line 52a is a delayed end-of-character signal from the character receiver which indicates that a character has been loaded into the character receiver 52. The gray bits per character counter circuit 51 is comprised of suitable counting means for the purpose of providing a count of at least three, which counting means is automatically reset upon the receipt of each end of character signal from line 52a. Suitable outputs are taken from the gray bits per character receiver which are indicative of the fact that none, one, two and three or greater gray bits have been indicated as being present in each received character. One typical circuit which may be employed is fully set forth in the copending U.S. application entitled Digital Self-Optimizing Terminal referred to above. The outputs of the gray-bits per character counter are signal lines 51a through 51c. Of these, signal line 51a indicates the presence of only one gray-bit in a character; signal 51b indicates the presence of two gray-bits; and, signal 51c indicates three gray-bits or more. The conjunction of the "1"-states of signals 55a and 51a upon error logic 56 permits gray-bits data in the gray-bits register to be used to correct Hamming-2 codes which are rejected by the error logic's error detection capability. The error logic circuit 56 thus makes an initial examination of a received character to determine if it is in fact a valid one. After the test determines that the character is not a valid character, the signal lines 55a and 51a are employed by the error logic circuit 56 for the correction operation. Error logic circuitry of this type is fully set forth in the above mentioned copending application entitled Digital Self-Optimizing Terminal. The conjunction of the "1"-states of 55c and 51a upon error logic 56 permits Hamming-3 correction of codes containing up to one gray-bit. The conjunction of the "0"-state of 55c and the "1"-state of 51a upon error logic 56 leads to requests for a repeat of a transmission. Similarly, the coexistence of the "1"-states of signals 55b and 51b, or the "1"-state of signal 51c at any time upon error logic 56, leads to repeat transmission requests via signal line 56a impressed upon supervisory transmitter 57.

When secondary correction of Hamming-2 codes is carried out, signal line 56b from the error logic 56 to the gray-bits register 54 is a means of invoking correction. The actual correction signal is by one of the paths marked 54a according to the location of the single gray-bit in the gray-bits register. The bit correction operation is carried out by the simultaneous presence of a correction signal in line 56b together with a gray bit indication in one of the stages of gray bits register 54. The accompanying data bit of the character receiver is then pulsed by one of the lines 54a from gray bits register 54 which is associated therewith for the purpose of reversing the state of the associated data bit contained in character receiver 52. The circuitry of the gray bits register 54 of the character receiver 52 performing this error correction operation is fully set forth in the above mentioned copending application entitled Digital Self-Optimizing Terminal.

*Differential phase shift tone equipment adaptation of DPSK carrier equipment to varying link phase shift and to dropout*

Two-level differential phase shift tone equipment is protected against varying link phase shift displacements by virtue of its DPS (differential phase shift) character. The two levels of shift are 0° and 180° with respect to a reference which is derived from the instantaneous incoming carrier. In deriving the reference for the two binary characterizations, the incoming carrier is subjected to full-wave rectification at the same time that it is also fed to the "mark"- and "space" phase detectors. The output of the full-wave rectifier is thus an AC signal at twice the carrier frequency and in an exact and constant relationship to the incoming carrier. This output is then halved and used to develop two reference AC sine waves which is again in a fixed and constant phase relationship to the incoming carrier. Of the two reference AC sine waves which are thus obtained, one is in a 0°-phase relationship to the incoming carrier and one is in a 180°-phase relationship. Of the two reference sine waves, one is an input to the "mark" phase detector and the other is an input to the "space" phase detector. Accordingly, the binary information is decoded with respect to what is essentially a reference element in the incoming carrier. As a result, regardless of varying link phase shifts, the decoding of the information is always tied to the reference element of the incoming carrier and therefore compensates exactly for any phase shift which the link applies.

In the event of a dropout (i.e. loss of carrier), the means of deriving the reference is able to sustain itself for periods of one millisecond, and, on the other hand, is able to re-establish itself with two milliseconds of a loss of the carrier signal. Whether the reference device recovers in a 0° or 180° relationship to the carrier after a dropout is of no consequence to a data receiver since the "1" and "0" significances of a data train are always determined by the "start"-bit of each character code as the basic reference of binary significance. Because of this fact, the Transitel DPSK tone equipment is also protected against ill-effects of dropout. Still another protection in this regard is the fact that the receiver's demodulator output is blocked whenever the carrier is lost because during such periods the reference device becomes disengaged. The reference device is thus a means of monitoring link continuity.

*Reasons for the preferred use of DPSK carrier equipment*

Reference to FIGURES 4 and 5 will substantiate the superior performance of DPSK equipment to white noise, burst noise, impulse noise and dropout noise disturbances over other types of carrier equipment.

*Differential phase shift tone receiver*

FUNCTION

The differential phase shift tone receiver is used to receive and demodulate phase shift carrier information. The output of the receiver is a binary pulse train which corresponds in basic form to the input pulse train used to modulate the carrier output of the differential phase shift tone transmitter. In essence the DPS tone receiver detects reference phase information within the incoming carrier, and then signals the shifts and dwells of the source train on a half-cycle basis as the incoming carrier information is in-phase or 180° out-of-phase with the reference.

THEORY

The configuration of the DPS tone receiver 100 is shown in block diagram form in FIGURE 7.

Carrier information received from the link is passed by the carrier receiver elements to three functional sections. Of these, the reference phase detector detects the reference phase element of the incoming information, and converts this information into two signals; an in-phase signal which is fed to one of two phase detectors; and a 180°-out-of-phase signal which is fed to the second phase detector. Using its reference signal, the "mark" detector signals the demodulator to indicate all half-cycles of the carrier which are in the "mark" phase while the "space" detector uses its reference signal to similarly indicate "space" phase information in the carrier. The phase detector signals are fed to the demodulator where "mark" detection signals result in a "mark" output of the demodulator and "space" detection signals result in a "space" output. Accordingly, over a period of time, the demodulator puts out a binary pulse-train corresponding to modulated information in the incoming carrier.

EQUIPMENT

A. *Carrier receiver section.*—The incoming carrier signals are received at 101 from the link and put through the automatic threshold amplifier 102 where a variable gain is applied to the signal to develop a two-volt peak-to-peak output. The automatic threshold amplifier is used to assure a contant input signal amplitude to the balance of the receiver, regardless of the incoming signal amplitude at 101 provided that the level at 101 is in the range from −40 dbm to −5 dbm. The receiving level adjustment unit consists of a resistance-coupled emitter follower whose emitter load is a potentiometer. Adjustment of the potentiometer to accommodate the levels of the reference signals to the phase detectors eliminates spurious phase detector outputs. The automatic threshold amplifier 102 employed herein is of the type described in copending U.S. application Ser. No. 275, 937, filed Apr. 26, 1963 by A. Brothman et al. and assigned to the assignee of the instant invention. A full and complete description of the circuitry contained in this application has been omitted for purposes of clarity. The carrier, after adjustment by 103 is fed to the phase shifter 104. The phase shifter's output consists of two signals which are 180°′″-out-of-phase with one another but in both of which the information sidebands have been shifted relative to the carrier frequency component. The signal at 104b is relayed via a Darlington emitter follower 105 to become the feed to the reference phase detector 107 and the signal at 105 is similarly relayed to become the feed to the phase detector 109 of mark detector 108. The emitter followers provide total isolation between the reference elements and the detectors.

B. *Reference phase detector.*—The information wave train at 106, which is illustrated at (d) in FIGURE 8, is applied to a full-wave rectifier 110 where it develops an output as per (e) in FIGURE 8. This output of 110 is a full-wave rectified train of half sine waves at twice the carrier frequency and is applied to a Type 1 ringing circuit 111 with resonant frequency twice that of the incoming carrier. The output of the ringing circuit 111 is a sine wave at a constant time-displacement from the excitation at the output of circuit 110 and is shown in FIGURE 8(f). Whenever the excitation information includes off-period information as a result of transition complexities, the ringing circuit, if in full engagement, neglects such complexities. Due to the rectification involved, the ringing circuit synchronizes with the basic carrier frequency only, and ignores the data modulation.

The sine wave from circuit 111 is relayed by an emitter follower 112 to a clipper amplifier 113, which produces an essentially square wave train output at 113a of a frequency equal to the sine wave as shown at FIGURE 8(g). The square wave train is passed by an emitter follower 114 to become the feed to a binary flip-flop 115. The flip-flop exerts a halving action and in turn puts out a square wave train that is at the carrier frequency. This wave train, at 115a provides triggering to a one-shot multivibrator 116, thus developing ringing excitation to a Type 2 ringing circuit 117. With excitation at the carrier frequency, the Type 2 ringing circuit puts out a sine wave at 117a which is relayed by a Darlington emitter follower 118 to become the feed to a phase shifter 119.

FIGURES 8(h) through 8(j), along with 8(e) through 8(g), indicate the need for the phase shifter. This unit is adjusted to compensate for the cumulative phase angle displacements of the cascaded devices. The phase shifter puts out two signals, one of which is in-phase with the information carrier's reference element and another which is 180°-out-of-phase with it. These signals, one at 119a and at 119b, are the phase reference inputs to the phase detectors.

C. *Mark 108 and space 108′ detectors.*—Each phase detector receives two inputs: the information-carrier from 105a and a phase reference signal from the reference phase detector.

On each half-cycle of the information-carrier, the carrier must be in-phase with the reference signal to one phase-detector 109 and 180°-out-of-phase with the reference signal to the opposite phase detector 109′. The in-phase condition produces an output with minor ripple on a basic −6 V. DC base-line while the out-of-phase instance produces half-cycle sine waves of an amplitude equal to the sum fo the amplitudes of the two compared half-cycles. This situation is illustrated in the cases of FIGURES 8(k) through 8(m). The outputs of the two phase detectors 109 and 109′ are then cross-compared in difference amplifiers 120 and 120′. When the output in 109a is the result of a 180°-out-of-phase relationship of the two inputs to the mark phase detector 108 and the output in 109a′ is therefore a minor ripple on a basic DC base-line, the output of the mark difference amplifier 120 at 120a is a series of positive-going square pulses equal in number to the number of half-cycles of output in 109a. Conversely, when the reverse is true, the output of the space difference amplifier is such a series of square wave pulses. In each instance, whichever difference amplifier is the instantaneous source of square wave detection pulses, the opposite difference amplifier is the simultaneous source of a D.C. base-line. Accordingly, for each half-cycle of the carrier, a binary decision as to its phase is produced in either 121a or 121a′ [after passing through emitter followers 121 and 121′].

D. *Demodulator.*—The output demodulator section is a dual input flip-flop which responds to the inputs on 121a and 121′a. As such, the demodulator holds that binary output state which corresponds to its most recent input instruction. With the situations illustrated in FIGURES 8k through 8o, the outputs at 121a' and 121a, and also at the demodulator output, are shown respectively at FIGURES 8o through 8s.

The flip-flop output at 122a which is either at binary one or binary zero condition is the equivalent of the conventional tone carrier receiver 10, shown in FIGURE 2, such that the output 122a of demodulator 122 is impressed upon the quaternary decision logic 19 and the mark and space demodulator outputs 121a and 121a' would then be impressed upon the quaternary decision logic for the purpose of making "gray" or "not gray" decisions.

The detailed hardware employed for the purpose of carrying out the operation of the system shown in FIGURE 3, is shown in FIGURES 9 through 13. FIGURE 9 shows the circuitry employed for determining the four possible levels in which each incoming binary signal may lie, namely, the binary one condition, the gray-one condition, the binary zero condition and the gray-zero condition. Considering first the receipt of a signal which is in the binary one condition. The circuitry provided therefore is comprised of an AND gate 301 having a first input terminal connected to the output of emitter follower 233, shown in FIGURE 2a, which is binary one when a not-gray condition exists. The second input terminal is connected to the output 20 of demodulator 18, shown in FIGURE 2, which indicates that a binary one has been decoded by demodulator 18. The simultaneous appearance of these binary one conditions are passed by AND gate 301 and emitter follower 302 to the set input 303a of bistable flip-flop circuit 303. This causes its output terminal 303c to go to the binary one condition to indicate the presence of the receipt of a binary one condition. The output terminal 303b would necessarily be at the binary zero level.

Consider now the receipt of a signal which should be identified as gray one. The circuitry performing this is comprised of an AND gate 304 having one input terminal connected to the output of emitter follower 232, shown in FIGURE 2a, which is in the binary one state to indicate a grayness condition. The other input terminal is connected to the output terminal 20 of demodulator 18 in FIGURE 2, which is binary one when an incoming signal has been demodulated as being in binary one state. These conditions are passed by AND gate 304 and emitter follower 305, to the set input terminal 306a of bistable flip-flop 306. This causes its output terminal 306c to go to the binary one state to indicate a gray-one level signal has been received.

The circuitry to indicate the receipt of a binary zero level is comprised of AND gate 307 which has one input terminal connected to the output terminal of emitter follower 233, shown in FIGURE 2a, which is binary one when a not-gray condition exists. The other input terminal is connected to the output of demodulator 18 and is binary one when a binary zero condition has been demodulated. This binary one condition is passed by AND gate 307 and emitter follower 308 to flip-flop 309 causing its output terminal 309c to go to binary one. This indicates the presence of a good binary zero signal.

The circuitry for indicating the receipt of a gray-zero condition is comprised of AND gate 310 which has one input terminal connected to the output of emitter follower 232 shown in FIGURE 2a which is binary one in the case of a grayness condition. The other input terminal is connected to the output of demodulator 18 which output is binary one when a binary zero signal has been detected. This causes AND gate 310 to pass a binary one condition through emitter follower 311 to the set input terminal 312a of flip-flop 312 causing its output terminal 312c to go to binary one. This indicates the receipt of a gray-zero condition.

The circuits of FIGURE 9 so far described, are employed for the purpose of identifying the condition of each Nyquist interval of the incoming signals. A Nyquist interval is defined as the smallest interval of a transmission cycle in which the code elements at the operating frequency can be unambiguously resolved. For example, if the essential frequency range of transmission is limited to 2500 cycles per second, then 5000 is the maximum number of code elements per second that can be unambiguously resolved. The Nyquist interval therefore, is a half-cycle of the carrier. Thus, for example, when operating at 2500 cycles per second in a transmission system, each half-cycle is the smallest Nyquist interval. Thus, when operating at 1250 cycles per second, each binary bit transmitted is one full cycle in length and therefore contains two Nyquist intervals. If the maximum transmission rate is 1250 cycles per second and binary bits are transmitted at the rate of 625 bits per second, this means that each binary bit contains four Nyquist intervals. If, again, the transmission rate is 1250 cycles per second and the system is operating with binary bits being transmitted having a pulse width of four cycles, this means that each binary bit contains eight Nyquist intervals of the maximum transmission frequency of 1250 cycles per second. While it is felt that the above description is sufficient for understanding of the instant invention, a more detailed description of the Nyquist interval and its impact on a system such as that described herein, is set forth in greater detail in copending U.S. application, entitled Digital Self-Optimizing Terminal, Ser. No. 279,107, filed May 9, 1963, by A. Brothman et al. and assigned to the assignee of the instant invention.

Thus, each of the individual circuits for examining the incoming bits, shown in FIGURE 9, actually are employed for examining each Nyquist interval in incoming binary information. Let it be assumed that the maximum transmission rate for the system is 1250 cycles per second. That is, that the carrier frequency employed for transmission is 1250 cycles per second. Let it also be assumed, for purposes of one example, that binary bits are being transmitted that are one cycle in pulse width. This means that each binary bit transmitted is comprised of two half-cycles or Nyquist intervals. Each such Nyquist interval is examined by the circuitry 300 of FIGURE 9. The total number of Nyquist intervals, which are gray, are then counted by a counting circuit 313, shown in FIGURE 9, which is comprised of an OR gate 314 having two input terminals connected to the outputs of emitter followers 305 and 311 respectively. It can be seen that the outputs of these emitter followers are in binary one state when either a gray-one or gray-zero condition exists. Thus, as each Nyquist interval which is received is indicated as being gray, the binary condition is passed through OR gate 314 and emitter follower 315 to the input terminal 313a of the counter 313. Counter 313 is comprised of the bistable flip-flops 316–318 which are interconnected, in the manner shown in FIGURE 9, to form a counter capable of generating a total count of eight. The input to counter 313 is comprised of the OR gate 314 whose input terminals are connected to the outputs of emitter followers 305 and 311. The output of emitter follower 305 is in the binary one state upon the occurrence of a demodulated binary one state from the demodulator device together with a grayness indication from the quaternary decision logic output 232 of FIGURE 2a. This binary one condition is impressed upon the input terminal 313a of the counter through emitter follower 315 to advance the count of counter 313 by one.

As each Nyquist interval is examined by the circuitry shown in FIGURES 2a and 10 through 13, the number of Nyquist intervals which are identified as being gray are accumulated in counter 313. In accordance with statistical theory, interpretation of each received bit as to its grayness or correctness is determined in accordance with the Chart of FIGURE 14. The chart has been calculated for the three operating bit rates of 1250 cycles per second, 625 cycles per second and 312.5 cycles per second. One of the primary reasons for determining the calculations for three different bit rates is that the quaternary decision logic system of the instant application is capable of being utilized with a self-optimizing terminal facility such as the facility of the type described in copending U.S. application, Ser. No. 279,107, entitled Digital Self-Optimizing Terminal, filed May 9, 1963 by A. Brothman et al. and assigned to the assignee of the instant invention. Basically the system described therein has the capability of monitoring received information at a high bit rate [1250 cycles per second] for the purpose of determining the frequency of errors at that operating rate. If the number of errors reaches a statistically critical level, the system has the capability of undergoing a transition to a lower operating bit rate [625 cycles per second]. This transition is somewhat obvious, the effect being that the bit duration of each received binary bit being twice as long as that at the higher bit rate thereby acts to substantially increase the signal-to-noise ratio so as to diminish the probability of a received bit being errored. This system of the copending application also has the further capability of making the transition from a first operating code to a more redundant operating code to further reduce the probability that received bits will be errored.

Let it be assumed that the system is operating at the 1250 cycles per second bit rate. Referring to the charts of FIGURE 14 and for this bit rate it can be seen that bits at this bit rate are comprised of two Nyquist intervals. If the two received Nyquist intervals are both interpreted as being binary one intervals, it can be seen from a consideration of the left-handmost column that the bit will be interpreted as being binary one. If one of the two intervals are interpreted as being binary one and the remaining interval is interposed as being gray-one, the received bit is interpreted as being binary one. These two interpretations are shown in the two left-handmost columns of the chart for the 1250 cycles per second bit rate. Taking a further example, if one of the Nyquist intervals is interpreted as being binary one and the remaining interval is interpreted as being gray-zero, this received binary bit is interpreted as being gray-one. This is shown in the third column from the left of the 1250 cycles per second chart.

At the 625 cycles per second operating bit rate each received binary bit is comprised of four Nyquist intervals and the interpretations for all possible combinations of the Nyquist intervals are shown therein. For example, if two of the four Nyquist intervals are interpreted as being binary one, and the remaining two Nyquist intervals are interpreted as being gray-one, the bit is interpreted as being binary one. This can be seen from the fifth column from the left in the 625 cycles per second chart. As another example, if one of the four Nyquist intervals is interpreted as being binary zero and the remaining three Nyquist intervals is interpreted as being gray-zero, the received bit is interpreted as being gray-zero. This can be seen in the fourth column from the right.

Figure 14:
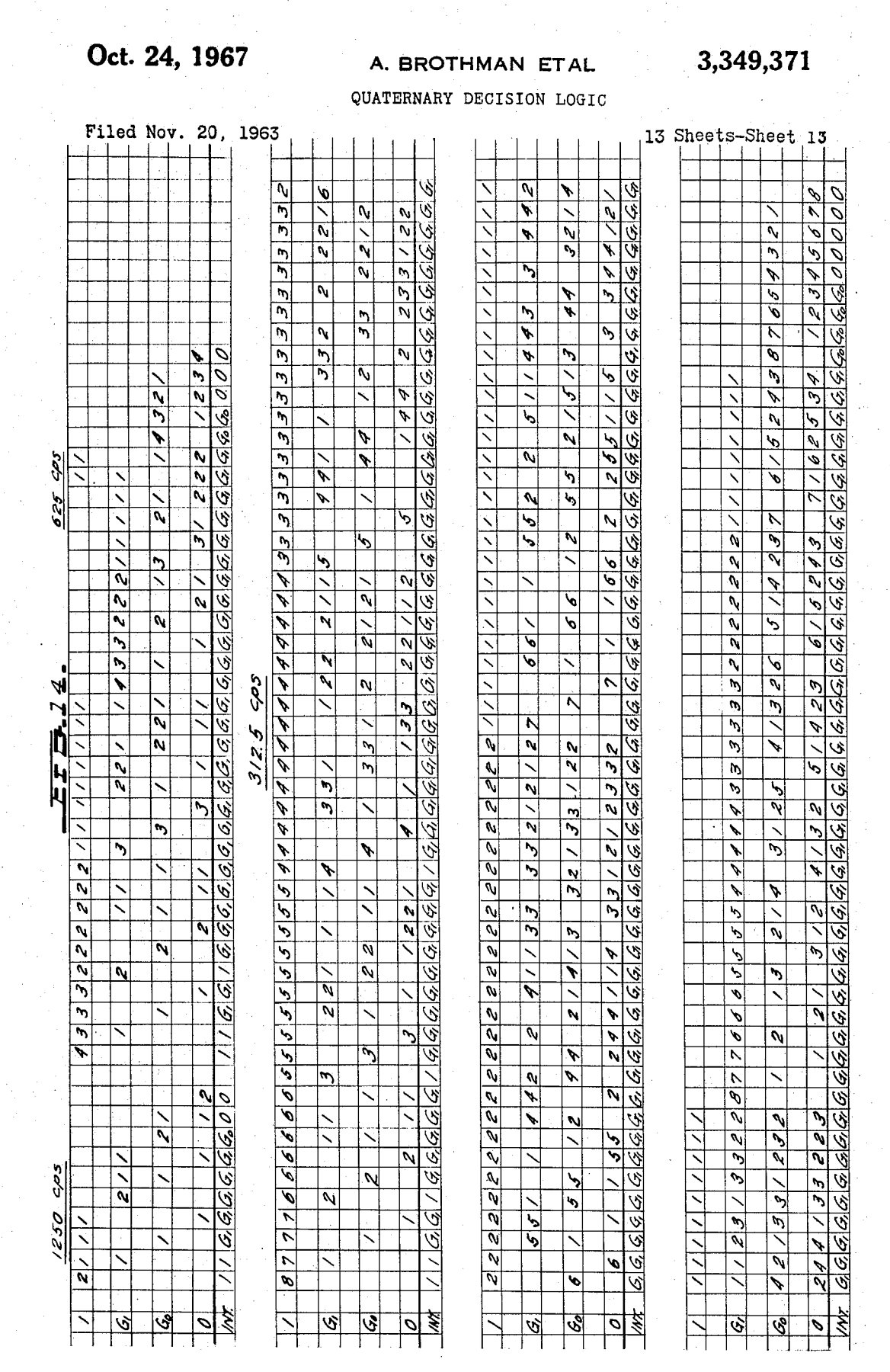

The bit interpretations for the 312.5 cycles per second operating speed are also shown in FIGURE 14. With a maximum operating speed of 1250 cycles per second, it can be seen that if the operating speed is 312.5 cycles per second, each received data bit is comprised of eight Nyquist intervals. The 312.5 cycles per second chart shows all of the combinations of possible Nyquist intervals and their interpretations in the same manner as those shown in the 625 and 1250 cycles per second charts.

Figure 11:
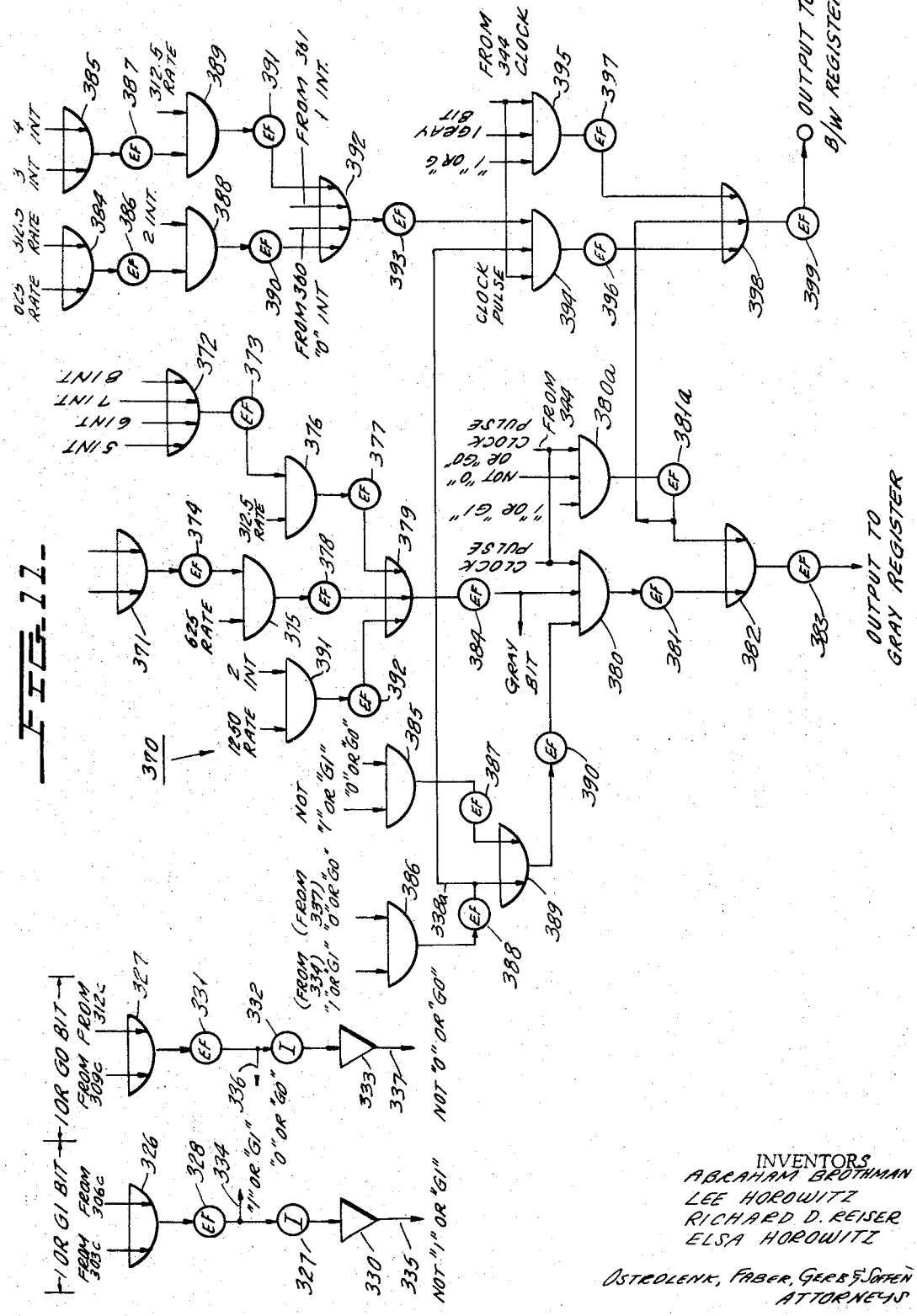

The manner in which these interpretations are electronically performed is by means of the circuitry of FIGURES 10 and 11. Considering first FIGURE 10, there is shown therein nine AND gates 350–358 respectively, for identifying the total number of Nyquist intervals in a received bit from zero through eight Nyquist intervals respectively. Consider first that the system is operating at the 1250 cycles per second bit rate. At this bit rate each received bit is comprised of two Nyquist intervals. Let it be assumed that both of these Nyquist intervals are identified as being gray-one by AND gate 304 of FIGURE 9. This being the case, AND gate 304 has its output impressed upon the OR gate 314 of Nyquist interval counter 313, causing it to generate a count of two. This causes the output terminals 316a, 317b and 318a of flip-flop stages 316, 317 and 318, respectively, to be in the binary one state. These binary states are passed by emitter followers 319, 322 and 323 respectively, and impressed upon the three inputs of AND gates 352. This causes the output of AND gate 352 to go to binary one, which condition is passed by emitter follower 362 so as to indicate the receipt of two gray Nyquist intervals.

The interpretation of the received gray Nyquist intervals is performed by the logical circuitry 370 of FIGURE 11. In the example where two gray Nyquist intervals have been received and the system is operating at the 1250 cycles per second bit rate the operation of the logical 370 is as follows:

The output of emitter follower 362, shown in FIGURE 10, is impressed upon one input of AND gate 391 and the logical circuit 370. The other input of AND gate 391 receives the indication that the system is operating at the 1250 cycles per second bit rate. The circuitry for performing this function is not shown in the instant invention for purposes of simplicity, but is shown in detail in the above mentioned copending application entitled Digital Self-Optimizing Terminal. Basically, the circuitry is comprised of a reversible counter, having at least three stages and operable so as to identify the three bit operating rates of 1250, 625 and 312.5 cycles per second bit rates. Thus, with two gray Nyquist intervals having been received and the system operating at the 1250 cycles per second bit rate, AND gate 391 develops a binary one output which is passed by emitter follower 392 and through one input of OR gate 379 and emitter follower 384 to one input of AND gate 380. AND gate 380 is provided with two additional input terminals, one of which receives a clock pulse, or synchronizing pulse, from the circuitry 325 of FIGURE 9, to be more fully described. The other input terminal receives the output from emitter follower 390, shown in FIGURE 11, which becomes binary one, in a manner to be more fully described. This causes AND gate 380 to develop a binary one condition at its output which is passed through emitter follower 381, OR gate 382 and emitter follower 383 to a line history counting means 400, shown in FIGURE 12, which operates in a manner to be more fully described. For the present, it suffices to understand that the line history counter 400 of FIGURE 12, counts the number of received binary bits which have been interpreted as being gray or ambiguous.

As a further example, let it be assumed that the system is operating at the 1250 cycles per second bit rate and that one Nyquist interval of a received bit is identified as binary one while the remaining Nyquist interval is identified as a gray-one. Returning to FIGURE 9, it can be seen that the output terminal 303c of flip-flop 303 will go to binary one. This condition will be passed by the emitter follower to one input terminal of OR gate 326 in the circuitry 325, shown in FIGURE 12. This binary one condition is passed through OR gate 326 and emitter follower 328 to the output terminal 334. Simultaneously therewith a binary one condition is passed through inverter circuit 327 and amplifier 330 to the output terminal 335. Thus, when either a one or a gray-one bit interval has been received, this condition appears as a binary one state at output terminal 334 and a binary zero state at output terminal 335. Output terminal 334 is connected to one input terminal of AND gate 386, shown in a logical circuitry 370 of FIGURE 11. The other input terminal of AND gate 386 is connected to output terminal 336 of circuitry 325, shown in FIGURE 12. This circuit is comprised of an OR gate 327 having input terminals connected to the output terminals 309c of flip-flops 309 and 312, respectively, through the emitter follower circuits, as shown in FIGURE 9. These output terminals 309c and 312c are in the binary one state when either a binary zero or gray-zero Nyquist interval has been received. Returning to the example where a binary one and gray-one indication have been received for one data bit while operating at the 1250 cycles per second bit rate, the output terminals 309c and 312c of flip-flops 309 and 312, respectively, are at the binary zero state. This causes OR gate 327 to fail to pass any binary one condition through emitter follower 331 to the output terminal 336. However, simultaneously therewith, this binary zero state is inverted by the inverter circuit 332 and amplified by 333 to cause a binary one condtion to appear at its output terminal 337. Thus, output terminal 337 is binary one when a no-zero or gray-zero interval has been received. Output terminal 337 is impressed upon the remaining input terminal of AND gate 386, shown in FIGURE 11, causing AND gate 386 to pass a binary one condition to emitter follower 388. Thus it can be seen that AND gate 386 passes a binary one condition when either a one or gray-one Nyquist interval has been received. This binary one condition is thus passed by emitter follower 388, having an output terminal 388a which is impressed upon one input terminal of AND gate 394. A second input terminal is connected to the output of the clock pulse source 340, shown in FIGURE 9 and to be more fully described. The remaining input terminal of AND gate 394 is connected to the output of emitter follower 393 which, in turn, is connected to the output of OR gate 392. One input of OR gate 392 is connected to the output of emitter follower 361, shown in FIGURE 10, the input of which is connected to the AND gate 351, which is binary one when one gray Nyquist interval has been received. AND gate 351 enters the binary one state due to its interconnection with the gray Nyquist interval counter 313 of FIGURE 9, previously described. Thus, this binary one condition is passed by AND gate 351 and emitter follower 361 of FIGURE 10, to be impressed upon one input of OR gate 392 which passes a binary one state through emitter followers 393 to one input of AND gate 394. This causes AND gate 394 to go to the binary one state, which condition is passed by emitter follower 396, OR gate 398 and emitter follower 399, which is binary one, to indicate that the received data bit has been interpreted as being zero, or one [i.e. not-gray]. This condition is impressed upon suitable register means [not shown] in order to provide a tabulation of the number of correct data bits received. One typical register which may be employed is described in the previously mentioned copending application entitled Digital Self-Optimizing Terminal. The purpose of keeping such a count is to permit the system to operate at a higher bit rate if a predetermined number of correct bits have been received without error.

The reset circuit 340 of FIGURE 9 is comprised of a clock source 340a which operates at either the 1250, 625 or 312.5 cycles per second bit rate. The output of the clock source 340a is impressed upon an inverter circuit 341. The output of clock source 340a is shown in the waveform diagram 340b and the output of inverter 341 is shown by the waveform diagram 341a. The operation is such as to invert the output waveform of clock source 340a with the output of inverter 341 by 180°. Thus at time $T_0$ when the clock pulses are going positive with the output of inverter 341, the clock pulses at time $t_0$ are going negative. At the end of each data interval, the output of clock pulse source 340a has each of its pulses going negative. Thus at the output of inverter 341, each pulse is going in the positive direction which is the beginning of the "dead" interval between two data bits. These positive going transitions are impressed upon the trigger input terminal 342a of one-shot multivibrator 342. Upon the receipt of each positive going transition, the outputs 342b and 342c of one-shot multivibrator 342 generate the wave forms 342d and 342e respectively. The waveform 342e at output terminal 342c is passed by emitter follower 343 to output terminal 344 to be impressed upon the inputs of AND gates 394, 395, 380 and 380a of the logical circuitry 370, shown in FIGURE 11, so as to time the passing of binary one conditions from these AND gates during the "dead" interval. The output waveform 342d at output terminal 342b of multivibrator 342 is employed as a delay circuit, such that the pulse moves in the negative direction at time $t_0$ and moves in the positive direction at time $t_1$, which positive going transition is passed by emitter follower 345 to trigger the one-shot multivibrator 346 at its trigger input terminal 346a. Thus, after a slight delay after the completion of each data interval, output terminal 346b of one-shot multivibrator 346, generates a waveform shown at 346c which is passed by emitter follower 347 and impressed upon the common bus 348 having bus branches 348a–348g, for the purpose of resetting flip-flop circuits 303, 306, 309, 312 of the Nyquist interval circuitry, as well as the flip-flop stages 316–318 of the Nyquist interval counter 313. The reset pulse developed at the output of one-shot multivibrator 346 is of short enough duration [approximately one microsecond] so as not to interfere with the interpretation of the next received Nyquist interval of the next data bit.

FIGURE 10 shows a bit interval counter 460 which is provided for the purpose for counting the number of bit intervals received at the receiver facility employing the quaternary decision logic system. The bit interval counter means 460 is comprised of an AND gate 461 having a first input terminal adapted to receive clock pulses from the clock pulse source 340a which generates square pulses at the 1250 cycles per second bit rate, in the manner shown by waveform 340b of FIGURE 9. The other input terminal of AND gate 461 is connected to the output terminal of the character receiving cycle identifying means 450. The character receiving cycle identifying means 450 is comprised of a bistable flip-flop circuit 451 having a said input terminal 451a which receives a binary one indication from the demodulator circuit 18 of FIGURE 2, as soon as the first binary bit of information is being received, in order to identify receipt of coded characters from a remote location. This binary one indication causes the output terminal 451b of flip-flop 451 to go to the binary one state to indicate the fact that the system is in a characters receiving cycle. At the time that all characters from the remote location have been transmitted an end-of-character signal is impressed upon the reset input terminal 451c of flip-flop 451 so as to develop a binary zero indication at the output terminal 451b. Assuming a characters receiving cycle to have begun, output terminal 451b is in binary one state, which state is passed by emitter follower 452 and impressed upon the other input terminal of AND gate 461. This enable AND gate 461 so as to pass clock pulses at the 1250 cycles per second bit rate which are, in turn, passed through emitter follower 462 upon the input terminal 463 of the bit interval counting means 460. The counting means is comprised of a multi-stage counter, each stage of which includes a bistable flip-flop circuit 464 which stages are connected in the manner shown in FIGURE 10. A suitable number of flip-flop stages 464 are provided and are connected in such a manner so that the last stage 464' generates a binary one level at its output terminal 464a' when a total of 512 bit intervals have been counted. This binary condition is passed through emitter follower 465 to the input terminal 471a of line history reset circuit 470.

The line history reset circuit 470 is comprised of three one-shot multivibrator circuits 471, 474 and 477. At the time that 512 bit intervals have been counted by the bit interval counter 460 of FIGURE 10, a binary one condition is impressed upon the input terminal 471a of one-shot multivibrator 471, shown in FIGURE 12, causing at time $t_0$ the negative and positive pulses shown in FIGURE 12, to be formed at the output terminals 471b and 471c respectively, of one-shot multivibrator 471. Each pulse has a pulse width of approximately ten microseconds. The pulse at 471c is passed through emitter follower 473 and is provided for the purpose of resetting the line history counter 400 in FIGURE 12, in a manner to be more fully described. At time $t_1$, which is approximately ten microseconds after time $t_0$, output terminal 471b goes positive, which state is passed by emitter follower 472 to trigger one-shot multivibrator 474 to form the negative and positive pulses at its output terminals 474b and 474c respectively. These pulse widths are likewise ten microseconds in length. The output at terminal 474c is passed by emitter follower 476, to be employed in the line history counter of FIGURE 12, in a manner to be more fully described. The output at 474b goes positive at time $t_2$, which time is approximately ten microseconds after time $t_1$, which condition is passed by emitter follower 475 to trigger one-shot multivibrator 477. Its output 477b forms the positive square pulse, shown in FIGURE 12, which pulse is passed by emitter follower 478 to be impressed upon line history counter 400 for a reset operation, in a manner to be more fully described. Thus it can be seen that the line history counter 400 of FIGURE 12 undergoes a reset operation each time 512 bit intervals [regardless of the number of Nyquist intervals] have been counted.

Figure 12:
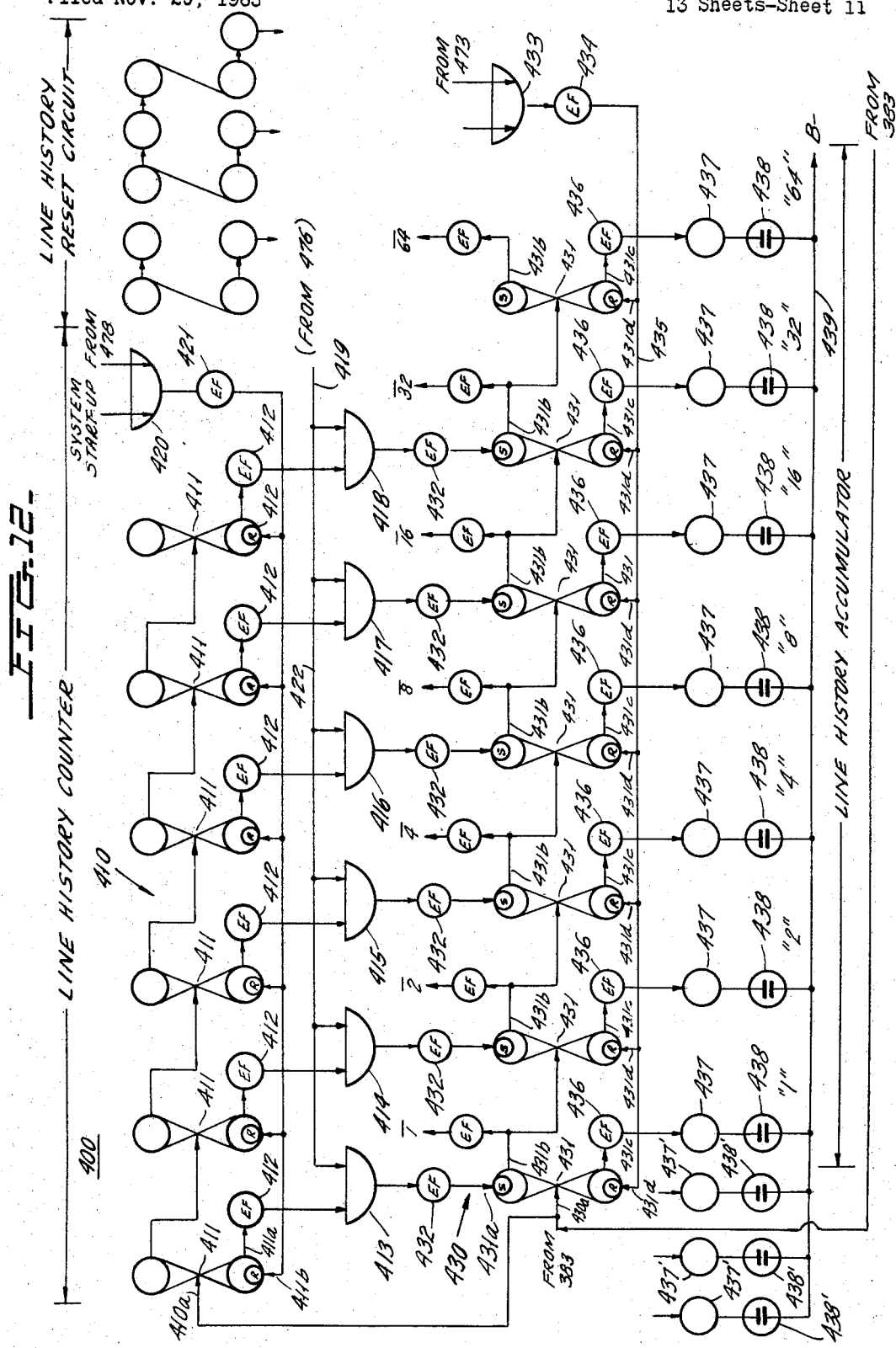

Turning now to FIGURE 12, the line history counter 400 is comprised of two separate counting means 410 and 430. The counting means 410 is comprised of a plurality of bistable flip-flop stages 411 connected in the manner shown in FIGURE 12. The input to counter 410 is the input terminal 410a which is connected to the common input bus 401 which, in turn, receives the output from emitter follower 383 of FIGURE 11, which goes to the binary one state each time a gray binary bit has been identified. The output from counter 410 is taken from each of the outputs 411a of each binary flip-flop 411 and is passed through an associated emitter follower 412 to one input of the AND gate group 413–418. The other input terminal of each AND gate 413–418 is connected to a common bus 419 which, in turn, is connected to the output 476 of line history reset circuit 470, shown in FIGURE 12.

Counting means 410 is reset by means of an OR gate 420 having first and second input terminals. One input terminal is connected to the output 478 of line history reset circuit 470 shown in FIGURE 12. The other input terminal receives a binary one pulse [for means not shown], at the time that the communication system starts up its operation. Either one of these two binary pulses are passed by OR gate 420 and emitter follower 421 to the common bus 422 which is connected to each of the reset input terminals 411b of each flip-flop stage 411.

The second counter 430 of line history counter means 400 has an input terminal 430a connected to the common input bus 401 which receives output pulses from emitter follower 383 of FIGURE 11 for the purpose of stepping counter 430. The counter 430 is further comprised of binary flip-flop stages 431 connected in the manner shown. The counter 430 has its count advanced by one each time a gray bit is identified. In addition thereto the set input terminal 431a of each flip-flop stage 431 (with the exception of the right-handmost stage) is connected through an associated emitter follower 432 to the outputs of AND gates 413–418, for a purpose to be more fully described.

Figure 13:
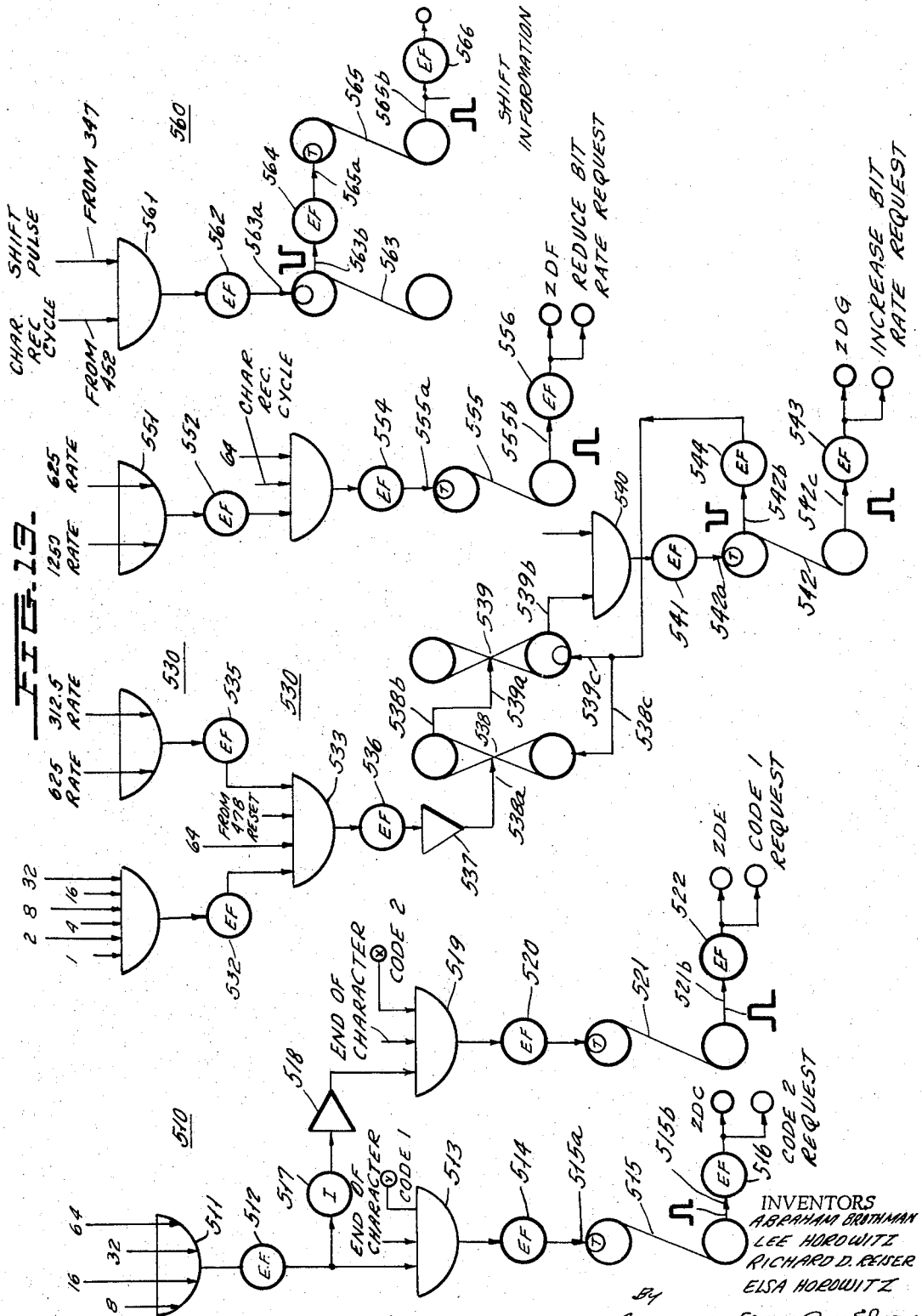

The counter 430 is reset by means of an OR gate 433 having first and second input terminals. The first input terminal receives a binary one pulse (by means not shown) when the system first starts its operation. The other input terminal is connected to output 473 of the line history reset circuit 470, shown in FIGURE 12. Either one of these binary one indications is passed by OR gate 433 and emitter follower 434 to the reset bus 435, which is connected in common to each of the reset input terminals 431d of the flip-flop stages 431. The output terminals 431c of each flip-flop stage 431 is connected through an associated emitter follower 436 to a neon driver circuit 437. Each neon driver circuit is series connected to a neon glow tube 438, the opposite terminal of which is connected to a $b$-minus bus 439. Each of the output terminals 431c of the flip-flop stages 431 go to the binary one stage when the counter 430 contains a decimal count of 1, 2, 4, 8, 16, 32 or 64, as shown by the numeral designations immediately adjacent each neon glow tube. Thus, for example, if a counter 430 contains a count of 15, the neon glow tubes 8, 4, 2 and 1 would be ignited; if counter 430 contains a count of 47, the neon glow tubes 32, 8, 4, 2 and 1 would be ignited. The neon driving circuits 437 are high-voltage transistor switches adapted to provide sufficient voltage for igniting the neon glow tubes under control of a binary one condition at the output terminals 431c and further adapted to extinguish the neon glow tubes upon the presence of a binary zero condition at the output terminals 431c associated with each neon driver circuit 437. The output terminals 431c, together with the output terminals 431b which are the complementary states of each output terminal 431c, are establishing the optimum bit rate and coding format which the system should be operating at in accordance with the link history of the system. The circuits which are employed for this purpose are shown in FIGURE 13 and will be more fully described.

The operation of the line history counter 400 is as follows:

As each Nyquist interval is examined, the requisite interpretations are made by the circuitry 300 of FIGURE 9. These interpretations control the operation of the logical circuitry 370 of FIGURE 11. As each bit which is received is designated as a gray bit, a binary one condition appears at the output of emitter follower 383, shown in FIGURE 11. This gray bit indication is impressed upon the input terminal 401 of line history counter 400, shown in FIGURE 12. Each such gray indication is simultaneously impressed upon the inputs 410a and 430a of the counters 410 and 430 respectively. Thus, each counter 410 and 430 is capable of accumulating a count of the total number of receive bits which have been marked as being gray.

Concurrently, with the operation of line history counter 400, the bit interval counter 460 shown in FIGURE 10, is generating a count each time a bit has been received. At the time that 512 bits have been received a binary one output appears at the output terminal of emitter follower 465 in bit interval counter 460. This binary one condition is impressed upon the input terminal 471a of line history reset circuit 470, shown in FIGURE 12. This causes the one-shot multivibrator 471 to generate a pulse at its output emitter follower 473 which is impressed upon one input of the OR gate 433, shown in FIGURE 12. This causes the counter 430 to be reset to zero. After a delay of approximately ten microseconds, one-shot multivibrator 474 of line history reset circuit 470 is triggered into operation, generating a square pulse at its output emitter follower 476. This pulse is impressed upon the input bus 419 of line history counter 400 enabling each of the AND gates 413–418 to pass the binary state of the output terminals 411a of each flip-flop stage 411 in counter 410. This operation thereby transfers the count developed in counter 410 into the count developed in counter 430.

After a second ten microsecond delay one-shot multivibrator 477 of line history reset circuit 470 generates a square pulse at its output emitter follower 478, which is impressed upon one input of OR gate 420 for 410, which pulse is passed by OR gate 420 and emitter follower 421 to reset each flip-flop stage 411 of counter 410.

Summarizing, line history counter 400 develops two identical counts in the counters 410 and 430, each count representing the total number of bits identified as being gray within an interval having a length of 512 received bits. Upon receipt of the 512th bit, counter 430 is first cleared, the contents of counter 410 is then transferred into counter 430 and then counter 410 is cleared.

Simultaneously with the clearance of counter 410, the output pulse at emitter follower output 478 of line history reset circuit 470 is impressed upon one input terminal of OR gate 467, shown in FIGURE 10, for the purpose of resetting the bit interval counter 460. This occurs by passing the binary one pulse through OR gate 467 and emitter follower 468 to reset bus 469 which impresses the binary one pulse upon the reset input terminal 464$b$ of each bistable flip-flop 464. Thus at the completion of counting 512 received data bits, interval counter 460 is reset for a new count of 512 bits.

Upon receipt of the next 512 data bits, the operation is repeated with the counter 430 being cleared, the contents of counter 410 being transferred into the counter 430 and the counter 410 now being cleared. It can be seen that since the contents of counter 410 is transferred into counter 430 before being cleared, this means that counter 430 indicates the number of bits which have been tagged as being gray, or ambiguous, are the last 1024 data bits received. With the total count in counter 430 being updated, every 512 receive bits.

In addition to the line history counter 400 of FIGURE 12 providing a visual indication of the total number of bits received which have been tagged as gray the line history counter is further provided with three additional neon glow tubes 438', each having a series connected neon driving circuit 437'. The inputs to the neon drivers 437' are the outputs of a circuit [not shown] which indicates the bit operating rate at which the system is functioning. Thus, the three neon glow tubes, only one of which will be ignited at any given time, provide an indication of whether the system is operating at the 1250, 625, or 312.5 bit rate. By an observation of the glow tubes, it can be determined immediately the total number of gray bits which have been received and the bit operating speed at which the system is functioning.

The gray bit counts developed in the line history counter means 400 is utilized by the logical circuits 500 of FIGURE 13. Considering first the logical circuit 510, let it be assumed that the system is operating by transmitting characters utilizing a first code and that the system is capable of operating by transmitting characters in a first code or in a second code in which the second code has greater redundancy in order to increase the reliability of characters transmitted. Assuming now that the system is operating at the less redundant code, the OR gate 511 of circuit 510 has four input terminals which are connected to the output terminals 431$c$ of counter 430, shown in FIGURE 12, which are the decimal 8, 16, 32 and 64 count outputs. Thus, as soon as eight or more gray bits have been counted by counter means 430, OR gate 511 passes a binary one condition through emitter follower 512 to one input of AND gate 513. A second input of AND gate 513 receives a binary one [from circuit means not shown] to indicate receipt of a completed character. The third input of AND gate 513 receives a binary one signal [from circuit means not shown] to indicate that the system is operating with the less redundant code. Thus, as soon as at least eight gray bits have been counted, an end-of-character condition has been reached and the system indicates that it is operating at the less redundant code, the AND gate 513 passes a binary one condition through emitter follower 514 to the trigger input terminal 515$a$ of a one-shot multivibrator circuit 515. This binary one condition causes the output terminal 515$b$ of multivibrator 515 to generate a trigger pulse which is passed through emitter follower 516 and is employed by circuit means, not shown, for transmitting a signal to the remote location which is transmitting the data, to request that the remote location operate by using the more redundant code. The circuitry for performing this function is set forth in detail in the aforementioned copending application entitled Digital Self-Optimizing Terminal and the circuitry employed for this purpose has been omitted from the instant application for purposes of clarity.

Assuming now the case where the system is operating at the more redundant code rate and that less than eight gray bits have been counted by the line history counter 400. This means that none of the input terminals of OR gate 511 will be at the binary one level since the count of counter 430 will be seven or less, so that a binary zero condition will appear at the output of emitter follower 512. This condition is inverted by the inverter circuit 517 and amplified by amplifier means 518 to be impressed upon one input terminal of AND gate 519. The other two input terminals of AND gate 519 are connected to the circuits for indicating the occurrence of an end-of-character condition and the fact that the system is operating at the more redundant code rate. As soon as these binary one conditions are simultaneously present at the inputs of AND gate 519, the gate passes a binary one condition through emitter follower 520 to the trigger input 521$a$ of one-shot multivibrator 521. This causes a trigger pulse to be developed at the output 521$b$ of multivibrator 521 which condition is passed by emitter follower 522. This trigger pulse is provided for the purpose of operating suitable circuit means to transmit an indication of the remote location transmitting that the remote location should return to the less redundant code rate.

Considering now the circuitry 520 of FIGURE 13, let it be assumed that the system is operating at the 625 bit per second rate. This causes a binary one condition to be impressed upon one input of OR gate 534, which binary one condition is passed by emitter follower 535 and impressed upon one input of AND gate 533. A second input of AND gate 533 receives a binary one condition from the output of emitter follower 478 of line history reset circuit 470, shown in FIGURE 12. A third input terminal of AND gate 533 is connected to the output terminal 431$b$ of the right-handmost stage of counter 430, which is the complementary output of the count-of-64 count stage of counter 430.

The remaining input terminal of AND gate 533 is connected to the output of emitter follower 532, which in turn is connected to the output of AND gate 531. AND gate 531 has six input terminals which are connected to the complementary output terminals 431$b$ of the remaining six stages of counter 430.

Now let it be assumed that the system is operating at the 625 bit per second rate and that no gray bits have been received. This being the case, all of the complementary output terminals 431$b$ of each flip-flop stage 431 in counter 430 will be in the binary one state. The first six stages being in the binary one state cause the AND gate 531 to pass a binary one through emitter follower 532 to AND gate 533. When this condition is present simultaneously with a binary one output at the complementary of the count-of-64 stage, plus the fact that line history counter 400 is about to be reset, plus the fact that the system is at the 625 bit per second rate, AND gate 533 generates a binary one which is passed by emitter follower 536 and amplifier 537 to the input terminal 538$a$ of a bistable flip-flop stage 538. This causes the output terminal 538$b$ of flip-flop stage 538 [which has just been previously reset to binary one in a manner to be more fully described] to go to the binary zero state. This binary zero state fails to trigger the next flip-flop stage 539.

Upon the receipt of the next 512 data bits, let it further be assumed that no gray bits have been accumulated in line history counter 400. This being the case, AND gate 533 will again generate a binary one state which will be impressed upon the input terminal 538$a$ of flip-flop stage 538. This will cause its output terminal 538$b$ to go to the binary one state, triggering flip-flop stage 539 into operation and causing its output terminal 539$b$ to go to binary one. This binary one condition is impressed upon one input of AND gate 540, the other input of which is connected to the end-of-character recognition circuit, previously described, causing the binary one condition to be passed by AND gate 540 as soon as an end-of-character condition is recognized. This binary one condition is passed by emitter follower 541 to the trigger input terminal 542a of one-shot multivibrator 542. This causes a square pulse to be generated at output terminal 542c of multivibrator 542 which is passed by emitter follower 543 to be impressed upon suitable circuitry for transmitting a request to increase the bit operating rate at the remote location doing the transmitting. Thus, if two adjacent periods in which 512 data bits are received are operated in an error-free manner, it is possible to step the system up from the 625 bit per second rate to the 1250 bit per second rate.

The output terminal 542b of one-shot multivibrator 542 generates a negative square pulse of the type shown in FIGURE 13. As soon as this square pulse terminates, its positive going portion is passed by emitter follower 544 and impressed upon the reset input terminals 538c and 539c of flip-flop stages 538 and 539 respectively. This causes the two flip-flop stages to reset in readiness for future operation. This reset pulse causes the output terminal 538b of flip-flop 538 to go to binary one and the output terminal 539b of flip-flop 539 to go to the binary zero state, thus resetting these flip-flop stages.

The circuitry 530 of FIGURE 13 is also operative for the purpose of stepping up from the 312.5 bit per second rate to the 625 bit per second rate with the OR gate 534 having two input terminals one of which is connected to the circuit indicating the system operation at the 625 rate and the other of which is connected to the circuit indicating 312.5 operating rate.

Considering now the circuitry 550 of FIGURE 13, there is provided therein an OR gate 551 having a first input terminal connected to the circuit indicating the operation of the system at the 1250 bit per second rate; having a second input terminal connected to the circuit indicating the operation of the system at the 625 bit per second rate. Assuming operation of the system at the 1250 bit per second rate, OR gate 551 passes a binary one condition through emitter follower 552 to one input of AND gate 553. A second input of AND gate 553 goes to binary one upon an indication of termination of the receipt of a character, while the third input terminal is connected to the output terminal 431c of counter 430, which is the stage for identifying 64 gray bit indications in counter 430. Thus with the system operating at the 1250 bit per second rate and with the end-of-a-character receiving cycle and with 64 bits being tagged as gray, AND gate 553 passes a binary one condition through emitter follower 554 to the trigger input terminal 555a of one-shot multivibrator 555. This causes a square pulse to be generated at output terminal 555b, which is passed by emitter follower 556 and impressed upon a suitable circuit for generating and transmitting a signal to the remote location transmitting, requesting that it reduce its bit operating rate. The circuitry 550 operates in the same manner when the system is functioning at the 625 bit per second rate and 64 gray bits have been received.

Considering now the circuitry 560, an AND gate 561 is provided which has a first input terminal connected to the output of emitter follower 452, shown in FIGURE 10, which is in the binary one state to indicate that the system is still within a character receiving cycle. The other input of AND gate 561 is connected to the output of emitter follower 347, shown in FIGURE 9, which is in the binary one state immediately after the receipt of each binary bit. Thus, when the system is in a character receiving cycle and a binary bit has been received, AND gate 561 generates a binary one indication through emitter follower 562 to the trigger input terminal 563a of one-shot multivibrator 563. This causes a negative pulse to be generated at its output terminal 563b which is passed by emitter follower 564 to the trigger input terminal 565a of one-shot multivibrator 565. At the trailing edge of this negative pulse, or when the pulse is moving in the positive direction, this is passed by emitter follower 564 to trigger the operation of one-shot multivibrator 565. This causes a pulse to be generated at its output terminal 565b after a slight delay of approximately ten microseconds. This pulse is passed by emitter follower 566 and is employed for the purpose of shifting the black and white or gray indications of output terminals 383 and 399, shown in FIGURE 11, into other suitable registers provided for the purpose of storing this data. These indications are stored in suitable registers which are employed for the purpose of performing certain error-correction capabilities which are fully described in the above mentioned copending application entitled Digital Self-Optimizing Terminal. These circuits have been omitted for purposes of clarity.

It can therefore be seen that the instant invention provides a novel quaternary decision logic circuit for systems such as, for example, the self-optimizing terminal system wherein data bits as received, in addition to being interpreted as one and zero, are further interpreted as being gray or not-gray and wherein this gray or not-gray tag bit associated with each data bit is monitored for the purpose of developing a link history of the communication system to establish the quantity of the transmission and reception at any given instant and by the use of suitable link statistics counting means the self-optimizing terminal is enabled to perform error-detection, error-correction, when the link history is good; request a speed change or coding technique change when the quantity of the link deteriorates and transmits speed change information to the sending location for the purpose of initiating such a change. Thus, by keeping a link history the quantity of the link at any given instant is definitely established and this condition together with the gray bits information serves to provide error-correction capabilities which could never before be realized for the coding techniques employed.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. For use in a communications system decision logic means for receiving binary information at a predetermined repetition rate and operating at a carrier frequency which is $n$ times the repetition rate of said binary repetition rate [where $n$ is an integer] comprising first means for identifying the binary state of each bit of said binary data; second means for receiving each Nyquist interval of each binary bit to determine whether each interval is either ambiguous or "1" or "0," third means for counting the number of ambiguous intervals in each binary bit to classify the binary bit examined as either ambiguous or unambiguous; fourth means for keeping a line history of ambiguous binary bits; fifth means responsive to said fourth means for requesting transmission at a lower bit rate when a predetermined number of ambiguous bits have been recorded by said fourth means per total bits received.

2. For use in a communications system decision logic means for receiving binary information at a predetermined repetition rate and operating at a carrier frequency which is $n$ times the repetition rate of said binary repetition rate [where $n$ is an integer] comprising first means for identifying the binary state of each bit of said binary data; second means for receiving each Nyquist interval of each binary bit to determine whether each interval is either ambiguous or "1" or "0," third means for counting the number of ambiguous intervals in each binary bit to classify the binary bit examined as either ambiguous or unambiguous; fourth means for keeping a line history of ambiguous binary bits; fifth means responsive to said fourth means for requesting transmission at a lower bit rate when a predetermined number of ambiguous bits have been recorded by said fourth means per total bits received; said communications system being operative at a plurality of predetermined binary bit repetition rates; sixth means responsive to said fourth means for transmitting a request for transmission of binary data at a higher bit rate when said fourth means has recorded no ambiguous binary bits per total bits received and transmission is occurring at a bit rate lower than the maximum bit transmission rate of the system.

3. For use in a communications system decision logic means for receiving binary information at a predetermined repetition rate and operating at a carrier frequency which is $n$ times the repetition rate of said binary repetition rate [where $n$ is an integer] comprising first means for identifying the binary state of each bit of said binary data; second means for receiving each Nyquist interval of each binary bit to determine whether each interval is either ambiguous or "1" or "0," third means for counting the number of ambiguous intervals in each binary bit to classify the binary bit examined as either ambiguous or unambiguous; fourth means for keeping a line history of ambiguous binary bits; fifth means responsive to said fourth means for requesting transmission at a lower bit rate when a predetermined number of ambiguous bits have been recorded by said fourth means per total bits received; said system being operative to transmit characters in a plurality of binary code formats; each of said codes having a different number of redundant bits; sixth means responsive to said fourth means for requesting transmission of data at a code having a higher redundancy when a predetermined number of binary bits have been recorded by said fourth means per total bits received and said transmission is occurring at a binary code having a lower redundancy.

4. For use in a communications system decision logic means for receiving binary information at a predetermined repetition rate and operating at a carrier frequency which is $n$ times the repetition rate of said binary repetition rate [where $n$ is an integer] comprising first means for identifying the binary state of each bit of said binary data; second means for receiving each Nyquist interval of each binary bit to determine whether each interval is either ambiguous or "1" or "0," third means for counting the number of ambiguous intervals in each binary bit to classify the binary bit examined as either ambiguous or unambiguous; fourth means for keeping a line history of ambiguous binary bits; fifth means responsive to said fourth means for requesting transmission at a lower bit rate when a predetermined number of ambiguous bits have been recorded by said fourth means per total bits received; said system being operative to transmit characters in a plurality of binary code formats; each of said codes having a different number of redundant bits; sixth means responsive to said fourth means for requesting transmission of data at a code having a lower redundancy when no binary bits have been recorded by said fourth means per total bits received and said transmission is occurring at a binary code having a higher redundancy.

5. For use in a communications system capable of operating at a predetermined carrier frequency decision logic means for receiving binary bits of data, each bit having a duration equal to $n$ times the duration of one cycle of said carrier frequency where $n$ is an integer; said decision logic means comprising first means for determining the binary state of each bit received; second means for receiving each Nyquist interval of each bit received there being at least two Nyquist intervals in each binary bit; said second means including third means for determining when each interval is ambiguous.

6. For use in a communications system capable of operating at a predetermined carrier frequency decision logic means for receiving binary bits of data, each bit having a duration equal to $n$ times the duration of one cycle of said carrier frequency where $n$ is an integer; said decision logic means comprising first means for determining the binary state of each bit received; second means for receiving each Nyquist interval of each received bit there being at least two Nyquist intervals in each binary bit; said second means including third means for determining when each interval is ambiguous; fourth means for counting the number of ambiguous intervals in each binary bit received.

7. For use in a communications system capable of operating at a predetermined carrier frequency decision logic means for receiving binary bits of data, each bit having a duration equal to $n$ times the duration of one cycle of said carrier frequency where $n$ is an integer; said decision logic means comprising first means for determining the binary state of each bit received; second means for receiving each Nyquist interval of each bit received there being at least two Nyquist intervals in each binary bit; said second means including third means for determining when each interval is ambiguous; fourth means for counting the number of ambiguous intervals in each binary bit received; fifth means responsive to said first means and said fourth means for determining the ambiguity of each binary bit received.

8. For use in a communications system capable of operating at a predetermined carrier frequency decision logic means for receiving binary bits of data, each bit having a duration equal to $n$ times the duration of one cycle of said carrier frequency where $n$ is an integer; said decision logic means comprising first means for determining the binary state of each bit received; second means for receiving each Nyquist interval of each bit there being at least two Nyquist intervals in each binary bit; said second means including third means for determining when each interval is ambiguous; fourth means responsive to said first means and said third means for generating a first signal when said first means identifies a bit as binary "1" and at least one of said intervals is unambiguous.

9. For use in a communications system capable of operating at a predetermined carrier frequency decision logic means for receiving binary bits of data, each bit having a duration equal to $n$ times the duration of one cycle of said carrier frequency where $n$ is an integer; said decision logic means comprising first means for determining the binary state of each bit received; second means for receiving each Nyquist interval of each bit there being at least two Nyquist intervals in each binary bit; said second means including third means for determining when each interval is ambiguous; fourth means responsive to said first means and said third means for generating a first signal when said first means identifies a bit as binary "1" and at least one of said intervals is unambiguous; fifth means responsive to said first means and said third means for generating a second signal when said first means identifies a bit as binary "1" and at least one of said intervals is ambiguous.

10. For use in a communications system capable of operating at a predetermined carrier frequency decision logic means for receiving binary bits of data, each bit having a duration equal to $n$ times the duration of one cycle of said carrier frequency where $n$ is an integer; said decision logic means comprising first means for determining the binary state of each bit received; second means for receiving each Nyquist interval of each bit there being at least two Nyquist intervals in each binary bit; said second means including third means for determining when each interval is ambiguous; fourth means responsive to said first means and said third means for generating a first signal when said first means identifies a bit as binary "1" and at least one of said intervals is unambiguous; fifth means responsive to said first means and said third means for generating a second signal when said first means identifies a bit as binary "1" and at least one of said intervals is ambiguous; sixth means responsive to said first and third means for generating a third signal when said first means identifies a bit as binary "0" and at least one of said intervals is unambiguous.

11. For use in a communications system capable of operating at a predetermined carrier frequency decision logic means for receiving binary bits of data, each bit having a duration equal to $n$ times the duration of one cycle of said carrier frequency where $n$ is an integer; said decision logic means comprising first means for determining the binary state of each bit received; second means for receiving each Nyquist interval of each bit there being at least two Nyquist intervals in each binary bit; said second means including third means for determining when each interval is ambiguous; fourth means responsive to said first means and said third means for generating a first signal when said first means identifies a bit as binary "1" and at least one of said intervals is unambiguous; fifth means responsive to said first means and said third means for generating a second signal when said first means identifies a bit as binary "1" and at least one of said intervals is ambiguous; sixth means responsive to said first and third means for generating a third signal when said first means identifies a bit as binary "0" and at least one of said intervals is unambiguous; seventh means responsive to said first and third means for generating a fourth signal when said first means identifies a bit as binary "0" and at least one of said intervals is ambiguous.

12. For use in a communications system capable of operating at a predetermined carrier frequency decision logic means for receiving binary bits of data, each bit having a duration equal to $n$ times the duration of one cycle of said carrier frequency where $n$ is an integer; said decision logic means comprising first means for determining the binary state of each bit received; second means for receiving each Nyquist interval of each bit there being at least two Nyquist intervals in each binary bit; said second means including third means for determining when each interval is ambiguous; fourth means responsive to said first means and said third means for generating a first signal when said first means identifies a bit as binary "1" and at least one of said intervals is unambiguous; fifth means responsive to said first means and said third means for generating a second signal when said first means identifies a bit as binary "1" and at least one of said intervals is ambiguous; sixth means responsive to said first and third means for generating a third signal when said first means identifies a bit as binary "0" and at least one of said intervals is unambiguous; seventh means responsive to said first and third means for generating a fourth signal when said first means identifies a bit as binary "0" and at least one of said intervals is ambiguous; eighth means for counting the number of ambiguous intervals in each bit received.

13. For use in a communications system capable of operating at a predetermined carrier frequency decision logic means for receiving binary bits of data, each bit having a duration equal to $n$ times the duration of one cycle of said carrier frequency where $n$ is an integer; said decision logic means comprising first means for initially determining the binary state of each bit received; second means for receiving each Nyquist interval of each bit there being at least two Nyquist intervals in each binary bit; said second means including third means for determining when each interval is ambiguous; fourth means responsive to said first means and said third means for generating a first signal when said first means identifies a bit as binary "1" and at least one of said intervals is unambiguous; fifth means responsive to said first means and said third means for generating a second signal when said first means identifies a bit as binary "1" and at least one of said intervals is ambiguous; sixth means responsive to said first and third means for generating a third signal when said first means identifies a bit as binary "0" and at least one of said intervals is unambiguous; seventh means responsive to said first and third means for generating a fourth signal when said first means identifies a bit as binary "0" and at least one of said intervals is ambiguous; eighth means for counting the number of ambiguous intervals in each bit received; ninth means responsive to said third, fourth, fifth, sixth and seventh means and the bit transmission rate for finally determining the state of each binary bit.

14. For use in a communications system capable of operating at a predetermined carrier frequency decision logic means for receiving binary bits of data, each bit having a duration equal to $n$ times the duration of one cycle of said carrier frequency where $n$ is an integer; said decision logic means comprising first means for initially determining the binary state of each bit received; second means for receiving each Nyquist interval of each bit there being at least two Nyquist intervals in each binary bit; said second means including third means for determining when each interval is ambiguous; fourth means responsive to said first means and said third means for generating a first signal when said first means identifies a bit as binary "1" and at least one of said intervals is unambiguous; fifth means responsive to said first means and said third means for generating a second signal when said first means identifies a bit as binary "1" and at least one of said intervals is ambiguous; sixth means responsive to said first and third means for generating a third signal when said first means identifies a bit as binary "0" and at least one of said intervals is unambiguous; seventh means responsive to said first and third means for generating a fourth signal when said first means identifies a bit as binary "0" and at least one of said intervals is ambiguous; eighth means for counting the number of ambiguous intervals in each bit received; ninth means responsive to said third, fourth, fifth, sixth and seventh means and the bit transmission rate for finally determining the state of each binary bit; said ninth means including means for generating an ambiguity signal when a predetermined number of ambiguous intervals occur in each bit.

15. For use in a communications system capable of operating at a predetermined carrier frequency decision logic means for receiving binary bits of data, each bit having a duration equal to $n$ times the duration of one cycle of said carrier frequency where $n$ is an integer; said decision logic means comprising first means for initially determining the binary state of each bit received; second means for receiving each Nyquist interval of each bit there being at least two Nyquist intervals in each binary bit; said second means including third means for determining when each interval is ambiguous; fourth means responsive to said first means and said third means for generating a first signal when said first means identifies a bit as binary "1" and at least one of said intervals is unambiguous; fifth means responsive to said first means and said third means for generating a second signal when said first means identifies a bit as binary "1" and at least one of said intervals is ambiguous; sixth means responsive to said first and third means for generating a third signal when said first means identifies a bit as binary "0" and at least one of said intervals is unambiguous; seventh means responsive to said first and third means for generating a fourth signal when said first means identifies a bit as binary "0" and at least one of said intervals is ambiguous; eighth means for counting the number of ambiguous intervals in each bit received; ninth means responsive to said third, fourth, fifth, sixth and seventh means and the bit transmission rate for finally determining the state of each binary bit; said ninth means including means for generating an ambiguity signal when a predetermined number of ambiguous intervals occur in each bit; tenth means for counting the number of ambiguous bits received; eleventh means for counting the total number of bits received; twelfth means responsive to said tenth means for clearing said ninth means after a predetermined number of bits have been received.

16. For use in a communication system decision logic means for receiving binary information at a predetermined repetition rate and operating at a carrier frequency which is $n$ times the repetition rate of said binary repetition rate (where $n$ is an integer) comprising first means for identifying the binary state of each bit of said binary data; second means for receiving each Nyquist interval of each binary bit to determine whether each interval is either ambiguous or "1" or "0," third means for counting the number of ambiguous intervals in each binary bit to classify the binary bit examined as either ambiguous or unambiguous; fourth means for keeping a line history of ambiguous binary bits; fifth means responsive to said fourth means for requesting transmission at a lower bit rate when a predetermined number of ambiguous bits have been recorded by said fourth means per total bits received; said fourth means comprising sixth means for counting said ambiguous bits; seventh means for counting the total number of binary bits received; eighth means responsive to said seventh means for clearing said sixth means after a predetermined count.

17. For use in a communications system decision logic means for receiving binary information at a predetermined repetition rate and operating at a carrier frequency which is $n$ times the repetition rate of said binary repetition rate [where $n$ is an integer] comprising first means for identifying the binary state of each bit of said binary data; second means for receiving each Nyquist interval of each binary bit to determine whether each interval is either ambiguous or "1" or "0," third means for counting the number of ambiguous intervals in each binary bit to classify the binary bit examined as either ambiguous or unambiguous; fourth means for keeping a line history of ambiguous binary bits; fifth means responsive to said fourth means for requesting transmission at a lower bit rate when a predetermined number of ambiguous bits have been recorded by said fourth means per total bits received; said fourth means comprising sixth means for counting said ambiguous bits; seventh means for counting the total number of binary bits received; said seventh means including eighth means for clearing said sixth means after a predetermined count; said sixth means comprising first and second counters for simultaneously accumulating ambiguous counts; said seventh means including means for clearing said first counter, means for transferring the count of said second counter to said first counter and means for clearing said second counter upon the occurrence of said predetermined count.

18. For use in a communications system decision logic means for receiving binary information at a predetermined repetition rate and operating at a carrier frequency which is $n$ times the repetition rate of said binary repetition rate [where $n$ is an integer] comprising first means for identifying the binary state of each bit of said binary data; second means for receiving each Nyquist interval of each binary bit to determine whether each interval is either ambiguous or "1" or "0," third means for counting the number of ambiguous intervals in each binary bit to classify the binary bit examined as either ambiguous or unambiguous; fourth means for keeping a line history of ambiguous binary bits; fifth means responsive to said fourth means for requesting transmission at a lower bit rate when a predetermined number of ambiguous bits have been recorded by said fourth means per total bits received; said fourth means comprising sixth means for counting said ambiguous bits; seventh means for counting the total number of binary bits received; said seventh means including eighth means for clearing said sixth means after a predetermined count; said sixth means comprising first and second counters for simultaneously accumulating ambiguous counts; said seventh means including means for clearing said first counter, means for transferring the count of said second counter to said first counter and means for clearing said second counter upon the occurrence of said predetermined count; said first counter including visual indicating means for providing an indication of the count in said first counter at any given instant.

References Cited

UNITED STATES PATENTS

| | | | |
|---|---|---|---|
| 2,813,149 | 11/1957 | Cory | 340—146.1 |
| 3,036,290 | 5/1962 | Zarouni | 340—146.1 |
| 3,078,443 | 2/1963 | Rose | 340—146.1 |

OTHER REFERENCES

Schwartz: Information Transmission Modulation and Noise, McGraw-Hill (New York, 1959), pp. 327–330.

MALCOLM A. MORRISON, *Primary Examiner.*

K. MILDE, *Assistant Examiner.*